US007851967B2

(12) United States Patent
Matsubara et al.

(10) Patent No.: US 7,851,967 B2
(45) Date of Patent: Dec. 14, 2010

(54) ELECTROSTATIC INDUCTION GENERATOR

(75) Inventors: Naoteru Matsubara, Ichinomiya (JP); Makoto Izumi, Gifu (JP); Yoshinori Shishida, Yoro-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 529 days.

(21) Appl. No.: 11/777,668

(22) Filed: Jul. 13, 2007

(65) Prior Publication Data
US 2008/0012343 A1    Jan. 17, 2008

(30) Foreign Application Priority Data
Jul. 14, 2006    (JP)    ............... 2006-194473
Jun. 15, 2007    (JP)    ............... 2007-159475

(51) Int. Cl.
H02N 1/00    (2006.01)
(52) U.S. Cl. .................. 310/309; 322/2 A; 290/1 R
(58) Field of Classification Search ................. 310/309; 322/2 A; 290/1 R
See application file for complete search history.

(56) References Cited

U.S. PATENT DOCUMENTS

| 2,567,373 | A | * | 9/1951 | Giacoletto et al. ......... 307/110 |
| 2,588,513 | A | * | 3/1952 | Giacoletto ................. 322/2 R |
| 3,405,334 | A | * | 10/1968 | Jewett et al. ................ 361/289 |
| 4,127,804 | A | * | 11/1978 | Breaux ...................... 322/2 A |
| 7,449,811 | B2 | * | 11/2008 | Suzuki et al. ............... 310/309 |
| 7,525,205 | B2 | * | 4/2009 | Mabuchi et al. ............ 290/1 R |
| 2008/0012343 | A1 | * | 1/2008 | Matsubara et al. ............ 290/2 |
| 2008/0258565 | A1 | * | 10/2008 | Murayama et al. .......... 307/400 |

FOREIGN PATENT DOCUMENTS

| JP | 2005-529574 | 9/2005 |
| WO | WO 03/105167 A2 | 12/2003 |

OTHER PUBLICATIONS

"Doublers of Electricity", Antonio Carlos M de Queiroz, Physics Education 42(2), Mar. 2007.*

* cited by examiner

Primary Examiner—Karl I Tamai
(74) Attorney, Agent, or Firm—Ditthavong, Mori & Steiner, P.C.

(57) ABSTRACT

An electrostatic induction generator requiring no electric power supply device and capable of being mounted on a printed board is obtained. This electrostatic induction generator includes a pair of first electrodes capable of storing charges, a pair of vibrating electrodes capable of vibrating in a first direction and a second direction different from the first direction, and charged with opposite charges due to charges stored in the pair of first electrodes respectively, and a second electrode for electrically connecting the pair of vibrating electrodes to each other in a case where the pair of vibrating electrodes are at prescribed positions.

20 Claims, 17 Drawing Sheets

TOP PLAN VIEW OF FIXED SUBSTRATE

BOTTOM PLAN VIEW OF COLLECTOR SUBSTRATE

TOP PLAN VIEW OF VIBRATING SUBSTRATE

BOTTOM PLAN VIEW OF VIBRATING SUBSTRATE

TOP PLAN VIEW OF FIXED SUBSTRATE

TOP PLAN VIEW OF VIBRATING SUBSTRATE

ELECTROSTATIC INDUCTION GENERATOR

CROSS-REFERENCE TO RELATED APPLICATIONS

The priority application number JP2006-194473, Electrostatic Induction Generator, Jul. 14, 2006, Naoteru Matsubara, Makoto Izumi and Yoshinori Shishida, upon which this patent application is based is hereby incorporated by reference.

BACKGROUND OF THE INVENTION

1. Field of the Invention

The present invention relates to an electrostatic induction generator.

2. Description of the Background Art

In general, there is known a compact electrostatic induction generator performing power generation with a vibration energy resulting from converting, into an electric energy, an energy having worked by applying charges to an electrode having a variable capacity to activate Coulomb attraction between opposed electrodes with the charges and vibrating a vibrator against the Coulomb attraction. In such a conventional electrostatic induction generator, it is the easiest way to forcibly retaining charges by providing voltage difference between the electrodes. In this case, however the generator requires an electric power supply device. An electrostatic induction generator using an electret film capable of retaining quasi-permanent electrical charge is known as a method for applying charges to an electrode without requiring an electric power supply device. The electrostatic induction generator using the electret film is constituted by a vibrating electrode, a fixed electrode and an electret film as a charge retaining material made of resin material such as Teflon (registered trademark) formed on the fixed electrode. In this electrostatic induction generator, the vibrating electrode is repeatedly vibrated or rotated, whereby the charges induced by the vibrating electrode are changed and are output as a current.

In the aforementioned electrostatic induction generator using the electret film, however, the electret film made of the resin material has a low heat resistance and hence may not disadvantageously be able to withstand a reflow soldering temperature of about 250° C. required for mounting a printed board. In this case, the electrostatic induction generator can not be disadvantageously mounted on the printed board.

SUMMARY OF THE INVENTION

An electrostatic induction generator according to a first aspect of the present invention comprises a pair of first electrodes formed at a prescribed interval from each other and capable of storing charges, a pair of vibrating electrodes so provided as to be opposed to the pair of first electrodes at a prescribed interval, capable of vibrating in a first direction and a second direction different from the first direction, and charged with opposite charges due to charges stored in the pair of first electrodes respectively, and a second electrode so provided at prescribed intervals from the pair of first electrodes as to be opposed to the pair of vibrating electrodes, for electrically connecting the pair of vibrating electrodes to each other in a case where the pair of vibrating electrodes are at prescribed positions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
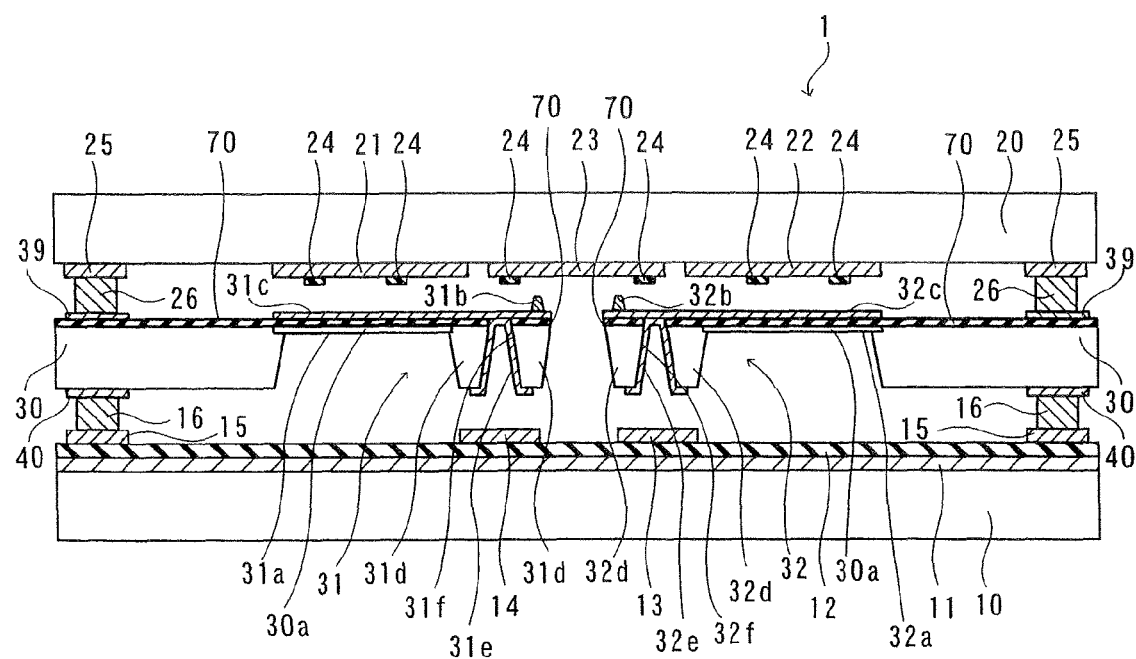
FIG. 1 is a sectional view taken along line 200-200 in FIGS. 3 to 6 of an electrostatic induction generator according to a first embodiment of the present invention.

Embodiments of the present invention will be hereinafter described with reference to the drawings. The same reference characters represent the same structures in the respective embodiments.

First Embodiment

A structure of an electrostatic induction generator 1 according to a first embodiment will be described with reference to FIGS. 1 to 6.

The electrostatic induction generator 1 according to the first embodiment is constituted by three layers of a fixed substrate 10 made of glass, a collector substrate 20 made of glass, a vibrating substrate 30 consisting of silicon arranged between the fixed substrate 10 and the collector substrate 20, as shown in FIG. 1. The fixed substrate 10 and the collector substrate 20 are examples of the "first substrate" and the "third substrate" in the present invention respectively. The vibrating substrate 30 is an example of the "second substrate" in the present invention. The structure of the electrostatic induction generator 1 will be now described in detail.

Figure 2:
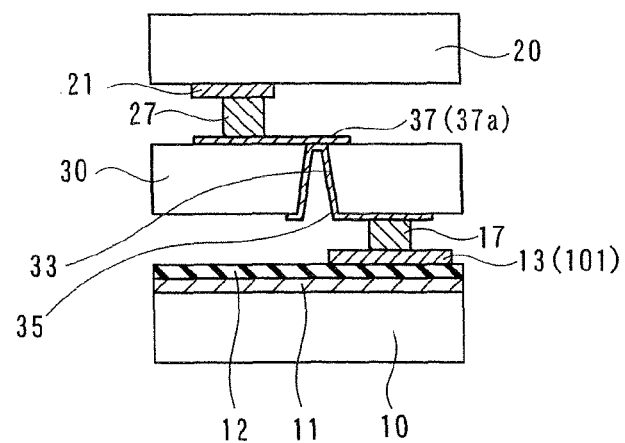
FIG. 2 is a sectional view taken along line 300-300 in FIGS. 3 to 6 of the electrostatic induction generator according to the first embodiment of the present invention.
Figure 3:
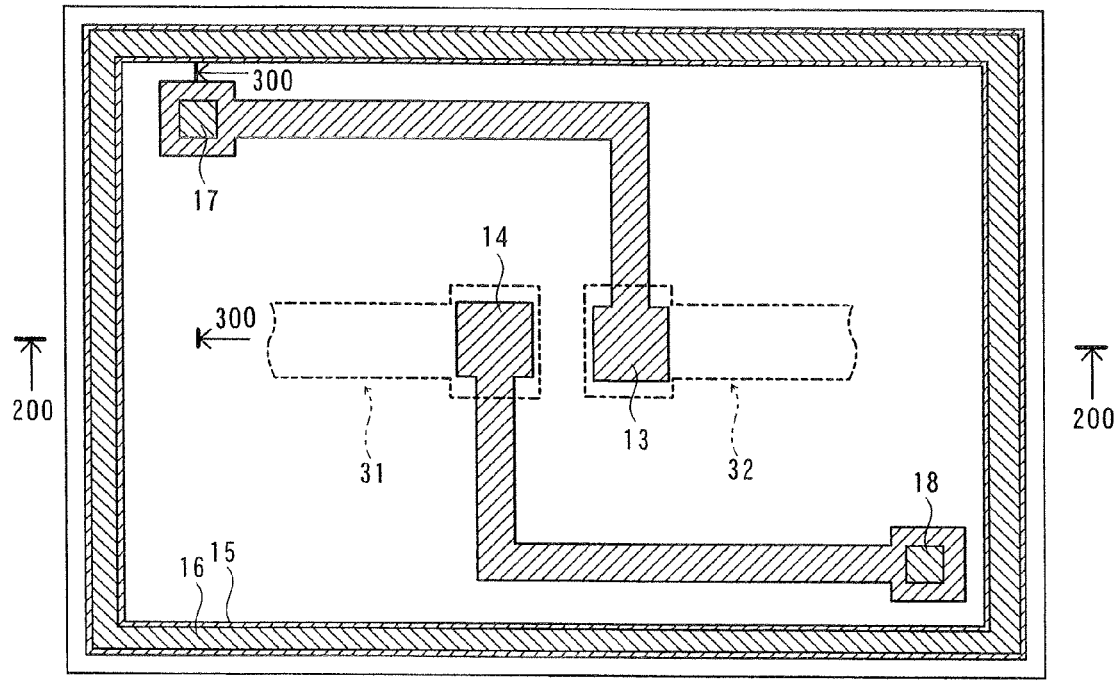
FIG. 3 is a top plan view of a fixed substrate of the electrostatic induction generator according to the first embodiment of the present invention.

As shown in FIG. 1, a floating electrode 11 of Au (upper layer)/Cr (lower layer) having a thickness of about 2 µm is formed on an upper surface of the fixed substrate 10 having a thickness of about 500 µm. The floating electrode 11 is so formed as to correspond to a first collector electrode 21 and a second collector electrode 22 described later. However, portions corresponding to the first collector electrode 21 and the second collector electrode 22 of the floating electrode 11 are electrically disconnected to each other dissimilarly to the first and second collector electrodes 21 and 22 electrically connected to each other. An insulating film 12 of $SiO_2$ having a thickness of about 2 µm is formed on a surface of the floating electrode 11. A first lower contact electrode 13 and a second lower contact electrode 14 of Au (upper layer)/Cr (lower layer) each having a thickness of about 2 µm and an adhesive layer 15 of Au (upper layer)/Cr (lower layer) having a thickness of about 2 µm are provided on a surface of the insulating film 12. The first lower contact electrode 13 and the second lower contact electrode 14 are examples of the "third electrode" in the present invention. A spacer 16 of Cu having a thickness of about 30 µm, for maintaining a constant interval between the fixed substrate 10 and the vibrating substrate 30 is formed on the adhesive layer 15. The spacer 16 is bonded to the fixed substrate 10 with the adhesive layer 15. As shown in FIG. 2, a connecting electrode 17 of Cu having a thickness of about 30 µm is provided on the first lower contact electrode 13. As shown in FIG. 3, a connecting electrode 18 of Cu having a thickness of about 30 µm is provided on the second lower contact electrode 14.

As shown in FIG. 3, the first and second lower contact electrodes 13 and 14 each have a L-shape and are electrically connected to the connecting electrodes 17 and 18 respectively. The adhesive layer 15 and the spacer 16 are circumferentially formed along four sides of the fixed substrate 10.

According to the first embodiment, the first and second collector electrodes 21 and 22 of Au (upper layer)/Cr (lower layer) each having a thickness of about 2 µm are so formed on a lower surface of the collector substrate 20 having a thickness of about 500 µm as to be opposed to a first vibrating electrode portion 31 and a second vibrating electrode portion 32 described later at prescribed intervals respectively, as shown in FIG. 1. The first collector electrode 21 and the second collector electrode 22 are examples of the "first electrode" in the present invention. According to the first embodiment, an upper contact electrode 23 of Au (upper layer)/Cr (lower layer) having a thickness of about 2 µm is formed between the first and second vibrating electrode portions 31 and 32 on the lower surface of the collector substrate 20 at prescribed intervals from the first and second vibrating electrode portions 31 and 32. The upper contact electrode 23 is an example of the "second electrode" in the present invention. According to the first embodiment, three pairs of stoppers 24 of SiN each having a thickness of about 1 µm are so formed on lower surfaces of the first collector electrode 21, the second collector electrode 22 and the upper contact electrode 23 as to be opposed to the first and second vibrating electrode portions 31 and 32 described later, respectively. The stopper 24 is an example of the "first contact inhibition member" in the present invention. An adhesive layer 25 of Au (upper layer)/Cr (lower layer) having a thickness of about 2 µm is so formed outside of the first and second collector electrodes 21 and 22 of the lower surface of the collector substrate 20 at prescribed intervals. A spacer 26 of Cu having a thickness of about 30 µm, for maintaining a constant interval between the collector substrate 20 and the vibrating substrate 30 is formed on a lower surface of the adhesive layer 25. The spacer 26 is bonded to the collector substrate 20 with the adhesive layer 25.

Figure 4:
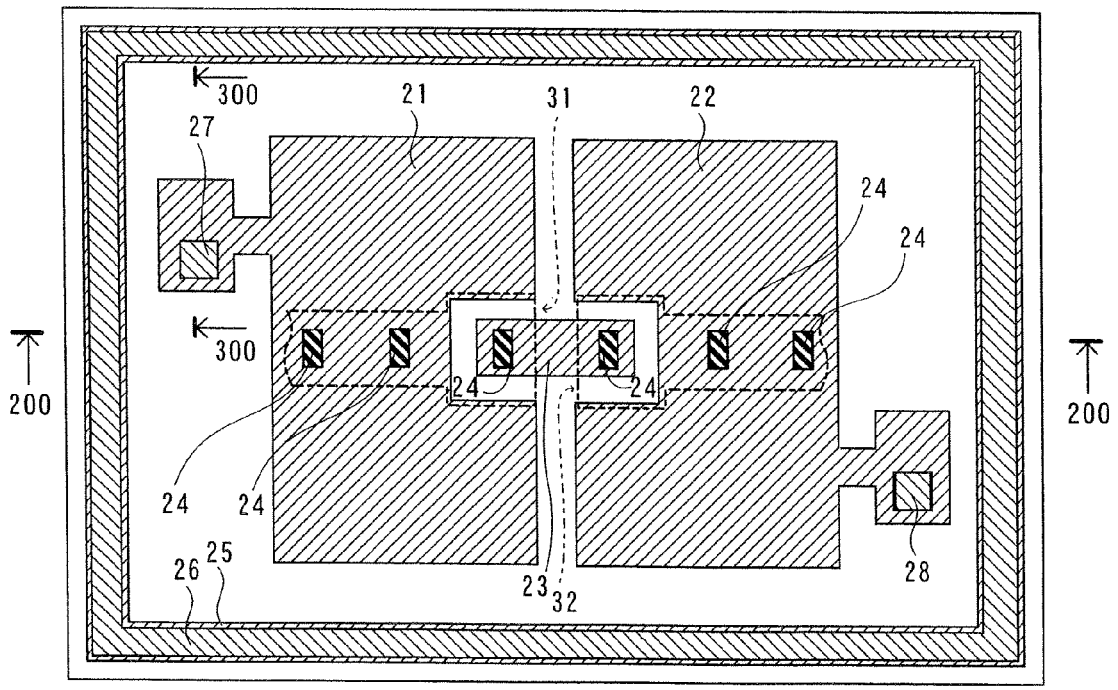
FIG. 4 is a bottom plan view of a collector substrate of the electrostatic induction generator according to the first embodiment of the present invention.

As shown in FIG. 2, a connecting electrode 27 of Cu having a thickness of about 30 µm is formed on a surface of the first collector electrode 21. As shown in FIG. 4, a connecting electrode 28 of Cu having a thickness of about 30 µm is formed on a surface of the second collector electrode 22. The adhesive layer 25 and the spacer 26 are circumferentially formed along four sides of the collector substrate 20.

According to the first embodiment, the vibrating substrate 30 having a thickness of about 500 µm is formed with the first and second vibrating electrode portions 31 and 32 each having a cantilever structure as shown in FIG. 1. The first and second vibrating electrode portions 31 and 32 are examples of the "vibrating electrode" in the present invention. As shown in FIG. 3, the first and second vibrating electrode portions 31 and 32 are so arranged to be opposed to the first and second collector electrodes 21 and 22 respectively. As shown in FIG. 3, the first and second vibrating electrode portions 31 and 32 are so arranged as to be opposed to the second and first lower contact electrodes 14 and 13 respectively.

Figure 5:
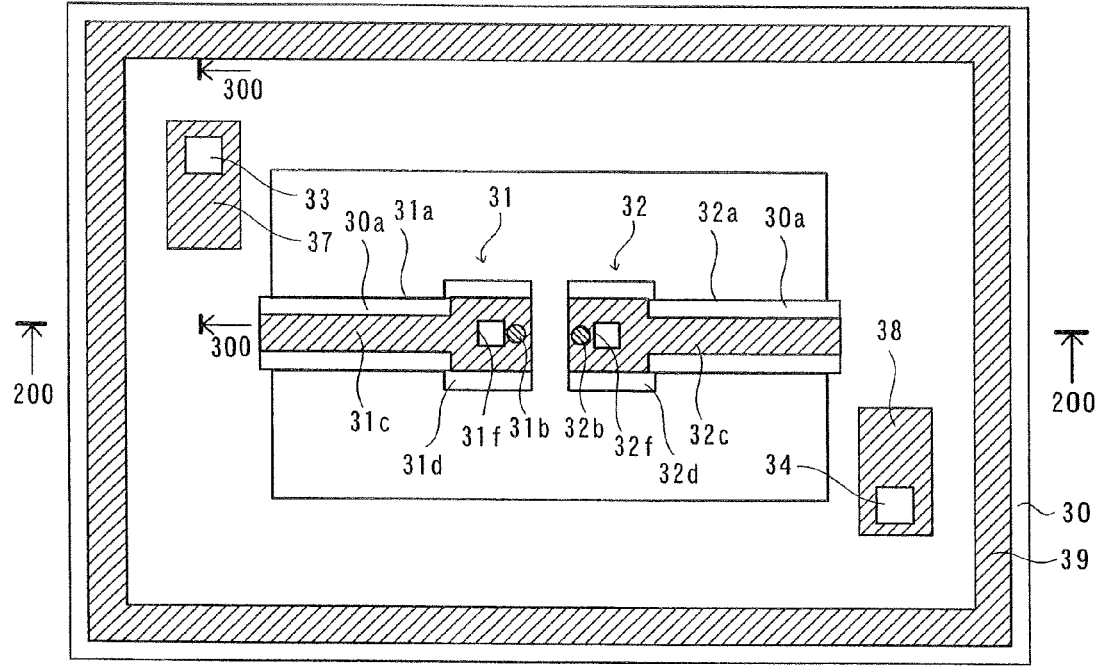
FIG. 5 is a top plan view of a vibrating substrate of the electrostatic induction generator according to the first embodiment of the present invention.
Figure 6:
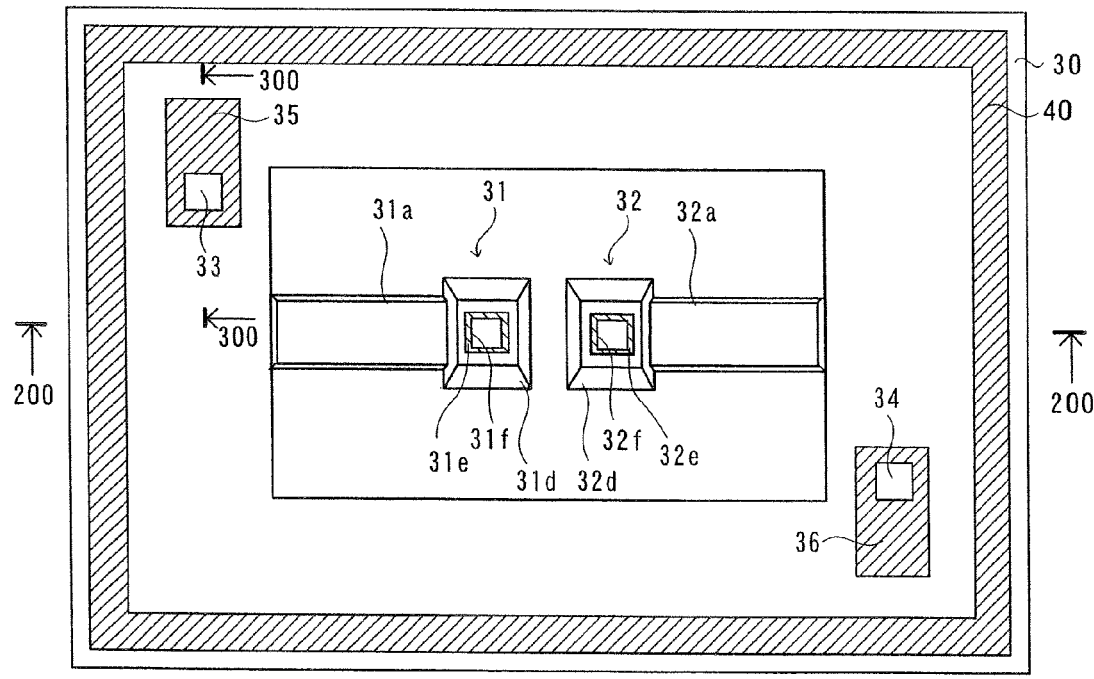
FIG. 6 is a bottom plan view of the vibrating substrate of the electrostatic induction generator according to the first embodiment of the present invention.

The first and second vibrating electrode portions 31 and 32 are formed with spring portions 31a and 32a each having a thickness of about 5 µm, protruding electrodes 31b and 32b of Cu each having a thickness of about 2 µm, vibrating electrode layers 31c and 32c of Au (upper layer)/Cr (lower layer) each having a thickness of about 1 µm, for producing electrostatic induction with charges stored in the first and second collector electrodes 21 and 22, weight portions 31d and 32d each having a thickness of about 500 µm and penetrating electrode layers 31e and 32e of Cu each having a thickness of about 1 µm. The vibrating electrode layer 31c is so formed as to cover an upper surface of the spring portion 31a and the weight portion 31d of the first vibrating electrode portion 31, while the vibrating electrode layer 32c is so formed as to cover upper surfaces of the spring portion 32a and the weight portion 32d of the second vibrating electrode portion 32. The protruding electrode 31b is so formed on an upper surface of the vibrating electrode layer 31c as to be opposed to the upper contact electrode 23 and is constituted such that the protruding electrode 31b is capable of coming into contact with the upper contact electrode 23 when the vibrating electrode layer 31c vibrates upward. The protruding electrode 32b is so formed on an upper surface of the vibrating electrode layer 32c as to be opposed to the upper contact electrode 23 and is constituted such that the protruding electrode 32b is capable of coming into contact with the upper contact electrode 23 when the vibrating electrode layer 32c vibrates upward. As shown in FIGS. 1 and 5, the first and second vibrating electrode portions 31 and 32 are formed with through holes 31f and 32f respectively. As shown in FIG. 1, the penetrating electrode layers 31e and 32e are so formed as to cover the through holes 31f and 32f and come into contact with the vibrating electrode layers 31c and 32c through the through holes 31f and 32f, respectively. As shown in FIGS. 2 and 6, the vibrating substrate 30 is formed with through holes 33 and 34. A penetrating electrode layer 35 of Cu having a thickness of about 1 µm is so formed as to cover an inner surface of the through hole 33 and a part of a lower surface of the vibrating substrate 30. As shown in FIG. 6, a penetrating electrode layer 36 of Cu having a thickness of about 1 µm is so formed as to cover an inner surface of the through hole 34 and a part of a lower surface of the vibrating substrate 30. As shown in FIG. 6, the penetrating electrode layer 35 and 36 are so formed as to come into contact with the connecting electrodes 17 and 18 formed on an upper surface of the fixed substrate 10 respectively when the vibrating substrate 30 and the fixed substrate 10 are overlapped with each other.

As shown in FIGS. 2 and 5, a wiring layer 37 of Au (upper layer)/Cr (lower layer) having a thickness of about 1 µm, for connecting the connecting electrode 27 and the penetrating electrode layer 35 is formed at the periphery of the through hole 33. As shown in FIG. 2, the wiring layer 37 formed on an upper surface of the vibrating substrate 30 is so formed as to come into contact with the connecting electrode 27 formed on a lower surface of the collector substrate 20 when the collector substrate 20 and the vibrating substrate 30 are overlapped with each other. As shown in FIG. 5, a wiring layer 38 of Au (upper layer)/Cr (lower layer) having a thickness of about 1 µm, for connecting the connecting electrode 28 and the penetrating electrode layer 36 is formed at the periphery of the through hole 34. The wiring layer 38 formed on the upper surface of the vibrating substrate 30 is so formed as to come into contact with the connecting electrode 28 (see FIG. 4) formed on the lower surface of the collector substrate 20 when the collector substrate 20 and the vibrating substrate 30 are overlapped with each other. An adhesive layer 39 of Au (upper layer)/Cr (lower layer) having a thickness of about 1 µm, for bonding the spacer 26 and the vibrating substrate 30 is circumferentially formed on the upper surface of the vibrating substrate 30 along four sides of the vibrating substrate 30. An adhesive layer 40 of Au (upper layer)/Cr (lower layer) having a thickness of about 1 µm, for bonding the spacer 16 and the vibrating substrate 30 is circumferentially formed on the lower surface of the vibrating substrate 30 along four sides of the vibrating substrate 30.

As shown in FIGS. 5 and 6, the first and second vibrating electrode portions 31 and 32 have shapes tapered from the upper surfaces of the first and second vibrating electrode portions 31 and 32 to the lower surfaces thereof respectively.

As shown in FIG. 2, the first collector electrode 21 and the first lower contact electrode 13 are electrically connected to each other through the connecting electrode 27, the wiring layer 37, the penetrating electrode layer 35 and the connecting electrode 17. Similarly, the second collector electrode 22 and the second lower contact electrode 14 are electrically connected to each other through the connecting electrode 28, the wiring layer 38, the penetrating electrode layer 36 and the connecting electrode 18.

Figure 7:
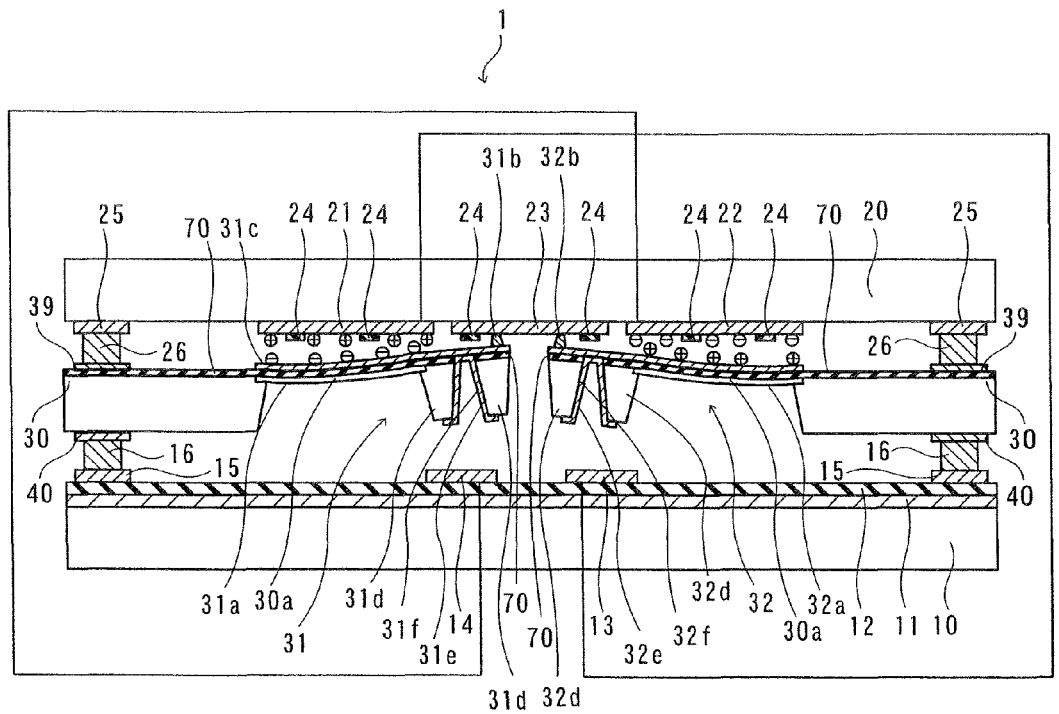
FIGS. 7 and 8 are sectional views for illustrating a power generating operation of the electrostatic induction generator according to the first embodiment of the present invention.
Figure 8:
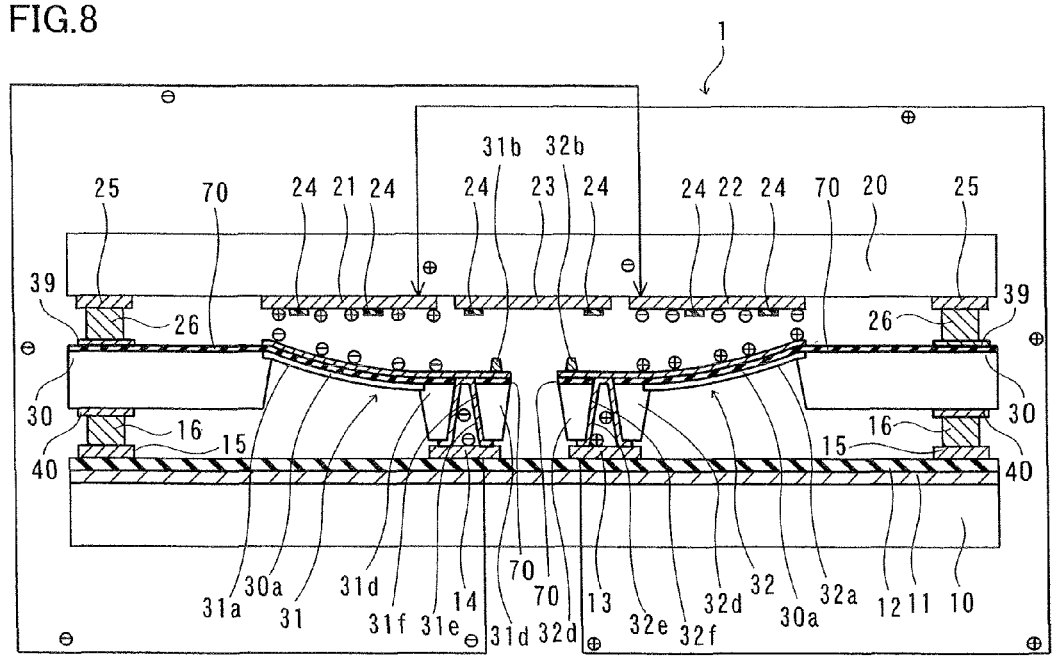

With reference to FIGS. 1, 7 and 8, a power generating operation of the electrostatic induction generator 1 will be now described.

When vibration is applied to the electrostatic induction generator 1, states shown in FIGS. 7 and 8 are repeated. FIG. 7 shows a state of induction of charges when the first and second vibrating electrode portions 31 and 32 vibrate in directions closer to the first and second collector electrodes 21 and 22 respectively. In this state, both the protruding electrode 31b of the first vibrating electrode portion 31 and the protruding electrode 32c of the second vibrating electrode portion 32 come into contact with the upper contact electrode 23 formed on the lower surface of the collector substrate 20, whereby the first and second vibrating electrode portions 31 and 32 are electrically connected to each other. At this time, charges opposite to charges stored in the first and second collector electrodes 21 and 22 are induced in the vibrating electrode layer 31c on an upper surface of the first vibrating electrode portion 31 and the vibrating electrode layer 32c on a upper surface of the second vibrating electrode portion 32 by electrostatic induction. As shown in FIG. 7, in a case where positive charges are stored in the first collector electrode 21 and negative charges are stored in the second collector electrode 22 for example, negative charges are stored in the vibrating electrode layer 31c and positive charges are stored in the vibrating electrode layer 32c.

FIG. 8 shows a state of carriage of charges when the first and second vibrating electrode portions 31 and 32 vibrate in directions separated from the first and second collector electrodes 21 and 22 respectively. In this state, the penetrating electrode layer 31e provided in the first vibrating electrode portion 31 and the penetrating electrode layer 32e provided in the second vibrating electrode portion 32 come into contact with the second and first lower contact electrodes 14 and 13 formed on the upper surface of the fixed substrate 10 respectively. At this time, positive charges induced in the vibrating electrode layer 32c on the upper surface of the second vibrating electrode portion 32 are collected in the first collector electrode 21 through the first lower contact electrode 13, the connecting electrode 17, the penetrating electrode layer 35, the wiring layer 37 and the connecting electrode 27. Similarly, negative charges induced in the vibrating electrode layer 31c on the upper surface of the first vibrating electrode portion 31 are collected in the second collector electrode 22 through the second lower contact electrode 14, the connecting electrode 18, the penetrating electrode layer 36, the wiring layer 38 and the connecting electrode 28. Thus, the first and second vibrating electrode portions 31 and 32 repeatedly vibrate so that the induction of charges and the carriage of charges are alternately repeated. Thus, positive charges induced in the second vibrating electrode portion 32 are stored in the first collector electrode 21, while the negative charges induced in the first vibrating electrode portion 31 are stored in the second collector electrode 22.

One of the features of this generator is to be capable of generating power by itself without any other electric power supply device. In an initial state, if either the first collector electrode 21 or the second collector electrode 22 is only slightly charged, charges are stored in the collector electrodes every time vibration resulting from induction due to these charges is repeated, thereby allowing increase in potential difference. Power generation can be performed due to this potential difference.

With reference to FIGS. 1, 7 and 8, in the electrostatic induction generator 1 according to the first embodiment, a description will be made of movable conditions of the first and second vibrating electrode portions 31 and 32 when a downward acceleration is applied. The following formula (1) shows a condition where the protruding electrodes 31b and 32b shown in FIG. 7 can be separated from the upper contact electrode 23 from the state of being contact with the upper contact electrode 23. The following formula (2) shows a condition where the penetrating electrode layers 31e and 32e shown in FIG. 8 can be come into contact with the second and first lower contact electrodes 14 and 13 respectively.

$$m \cdot a + k \cdot x_1 - q^2/2C_1 > 0 \quad (1)$$

$$m \cdot a - k \cdot x_2 - q^2/2C_2 > 0 \quad (2)$$

wherein m represents mass of the first and second vibrating electrode portions 31 and 32, a represents acceleration of the first and second vibrating electrode portions 31 and 32, and k represents spring constant of the spring portion 31a of the first vibrating electrode portion 31 and the spring portion 32a of the second vibrating electrode portion 32. $x_1$ represents a position of the first vibrating electrode portion 31 with reference to a position of the first vibrating electrode portion 31 shown in FIG. 1. $x_2$ represents a position of the second vibrating electrode portion 32 with reference to a position of the second vibrating electrode portion 32 shown in FIG. 1. q represents the quantity of charges induced in the first and second vibrating electrode portions 31 and 32. $C_1$ represents a capacitor capacity between the first vibrating electrode portion 31 and the first collector electrode 21 and a capacitor capacity between the second vibrating electrode portion 32 and the second collector electrode 22. $C_2$ represents a capacitor capacity between the first vibrating electrode portion 31 and the second lower contact electrode 14 and a capacitor capacity between the second vibrating electrode portion 32 and the first lower contact electrode 13. The electrostatic induction generator 1 according to the first embodiment can generate power in a state of satisfying the aforementioned formulas (1) and (2).

According to the first embodiment, as hereinabove described, the first and second collector electrodes 21 and 22 and the first and second vibrating electrode portions 31 and 32 are so provided as to be opposed to each other at the prescribed interval respectively and the upper contact electrode 23 electrically connecting the first and second vibrating electrode portions 31 and 32 when the first and second vibrating electrode portions 31 and 32 vibrate in the directions closer to the first and second collector electrodes 21 and 22 respectively, whereby electrostatic induction is produced in the vibrating electrode layers 31c and 32c with the charges stored in the first and second collector electrodes 21 and 22 when the first and second vibrating electrode portions 31 and 32 vibrate in the directions closer to the first and second vibrating electrode portions 31 and 32 respectively so that the vibrating electrode layers 31c and 32c can be charged with opposite charges. Thus, the charges induced in the vibrating electrode layers 31c and 32c are taken out, whereby power generation can be performed. In the electrostatic induction generator 1 according to the first embodiment, the first and second collector electrodes 21 and 22 made of an electrode material are used in place of an electret film made of a resin material, whereby a printed board can be easily mounted since the electrode material generally has a high heat resistance as compared with the resin material.

According to the first embodiment, as hereinabove described, the electrostatic induction generator is provided with the first and second lower contact electrodes 13 and 14 electrically connected to the first and second collector electrodes 21 and 22 to be opposed to the first and second vibrating electrode portions 31 and 32, whereby the first and second vibrating electrode portions 31 and 32 electrically comes into contact with the first and second lower contact electrodes 13 and 14 respectively when vibrating in the directions separated from the first and second collector electrodes 21 and 22 respectively. Thus, the charges (positive charges or negative charges) induced in the vibrating electrode layers 31c and 32c by electrostatic induction can be carried to the second and first collector electrodes 22 and 21 respectively.

According to the first embodiment, as hereinabove described, the first and second vibrating electrode portions 31 and 32 vibrate in the directions closer to the first and second collector electrodes 21 and 22 respectively to be charged and vibrate in the directions separate from the first and second collector electrodes 21 and 22 to connect to the first and second lower contact electrodes 13 and 14 respectively so that charges are carried to the first and second lower contact electrodes 13 and 14, whereby the induction of the charges by electrostatic induction produced in the first and second vibrating electrode portions 31 and 32 when the first and second vibrating electrode portions 31 and 32 vibrates in the directions closer to the first and second collector electrodes 21 and 22 respectively and the carriage of the charges, which are induced in the first and second vibrating electrode portions 31 and 32 when the first and second vibrating electrode portions 31 and 32 vibrate in the directions separated from the first and second collector electrodes 21 and 22 respectively, to the second and first collector electrodes 22 and 21 are repeatedly performed. Thus, the charges stored in the first and second collector electrodes 21 and 22 can be increased each time the first and second vibrating electrode portions 31 and 32 vibrate. In this case, the quantity of the charges induced in the first and second vibrating electrode portions 31 and 32 by the electrostatic induction depends on the quantity of the charges stored in the first and second collector electrodes 21 and 22, whereby the quantity of the charges induced in the vibrating electrode layers 31c and 32c can be increased each time vibration of the first and second vibrating electrode portions 31 and 32 is repeated.

According to the first embodiment, as hereinabove described, the stoppers 24 for inhibiting the first and second vibrating electrode portions 31 and 32 from electrically connecting to the first and second collector electrodes 21 and 22 are provided on the surfaces opposed to the first and second vibrating electrode portions 31 and 32 of the first and second collector electrodes 21 and 22 respectively, whereby the stoppers 24 can inhibit the first and second vibrating electrode portions 31 and 32 from electrically connected to the first and second collector electrodes 21 and 22 when the first and second vibrating electrode portions 31 and 32 vibrate in the directions closer to the first and second collector electrodes 21 and 22 respectively. Thus, the charges induced in the first and second vibrating electrode portions 31 and 32 can be inhibited from being reduced by electrical connection of the first and second vibrating electrode portions 31 and 32 to the first and second collector electrodes 21 and 22 respectively.

According to the first embodiment, as hereinabove described, the first and second vibrating electrode portions 31 and 32 each have the cantilever structure, and weight portions 31d and 32d are provided on the forward ends of the first and second vibrating electrode portions 31 and 32 respectively. The weight portions 31d and 32d denote portions allowing vibration of the first and second vibrating electrode portions 31 and 32 other than portions each having the smallest sectional area, respectively. The weight of the weight portions 31d and 32d is required to be increased in order to greatly vibrate the first and second vibrating electrode portions 31 and 32 by application of small acceleration. As this structure, in a case where the first and second vibrating electrode portions 31 and 32 having the cantilever structures including the weight portions 31d and 32d respectively are integrally formed by the same member, increase in the volume of the weight portions 31d and 32d allow the increase in the weight thereof, whereby the first and second vibrating electrode portions 31 and 32 can be easily greatly vibrate even by the small acceleration. Thus, power generation can be stably performed also when the small acceleration is applied to the first and second vibrating electrode portions 31 and 32.

A manufacturing process of the electrostatic induction generator 1 according to the first embodiment will be now described with reference to FIGS. 1 and 9 to 26.

Figure 9:
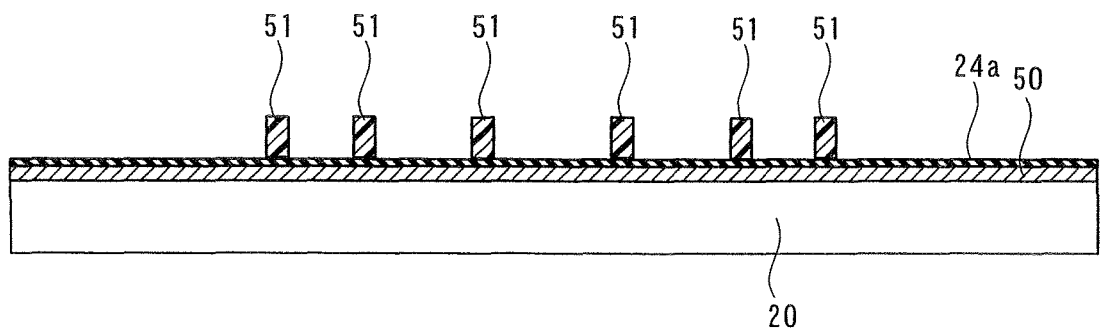
FIGS. 9 to 26 are sectional views for illustrating a manufacturing process of the electrostatic induction generator according to the first embodiment of the present invention.
Figure 10:
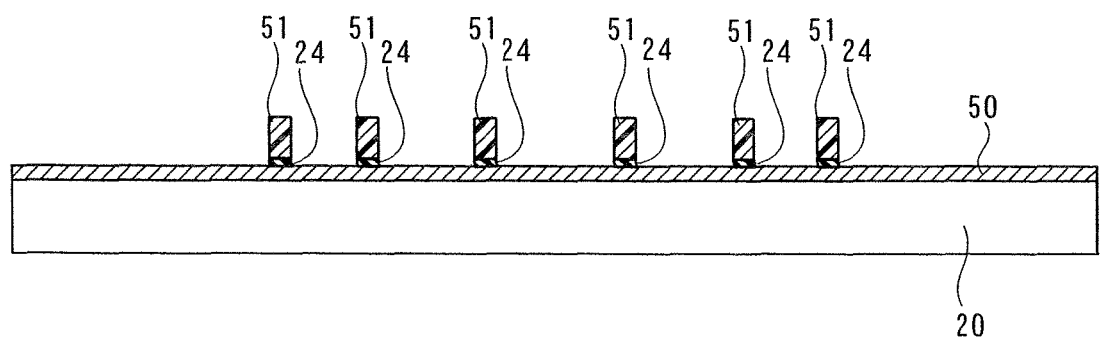

First, a manufacturing process of the collector substrate 20 will be described with reference to FIGS. 9 to 14. As shown in FIG. 9, a metal layer 50 of Au (upper layer)/Cr (lower layer) having a thickness of about 2 μm is formed on the upper surface of the collector substrate 20 made of glass having a thickness of about 500 μm by sputtering. A SiN film 24a having a thickness of about 1 μm is formed on the metal layer 50 by plasma CVD (Chemical Vapor Deposition). Then, the resist films 51 are employed as masks for dry-etching the SiN film 24a after the resist films 51 are formed on prescribed regions of the SiN film 24a by lithography. Thus, as shown in FIG. 10, the stoppers 24 of SiN film are formed. Thereafter the resist films 51 are removed.

Figure 11:
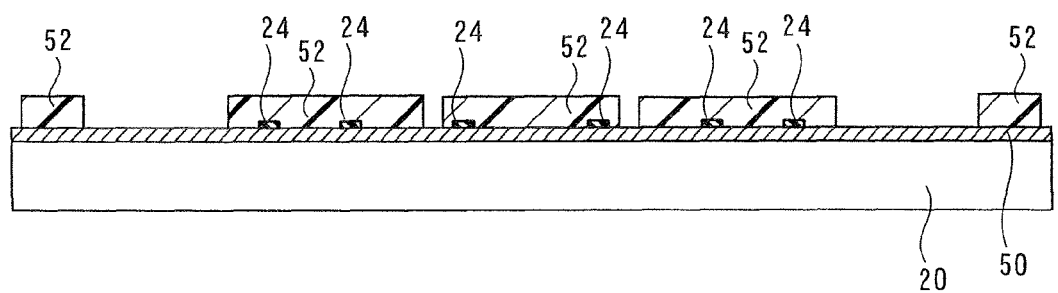
Figure 12:
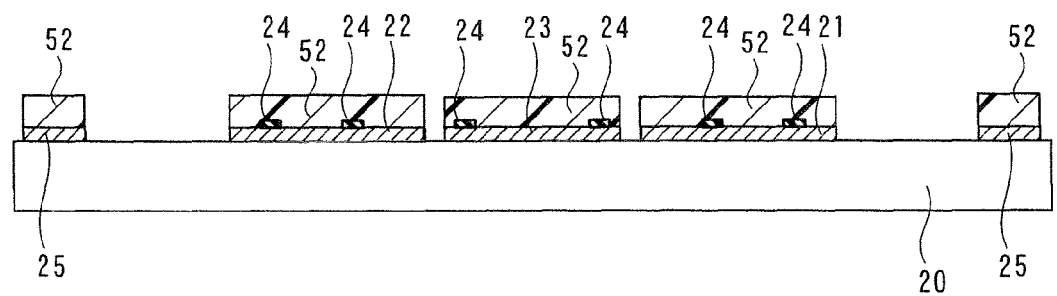

As shown in FIG. 11, after resist films 52 are formed on prescribed portions of the metal layer 50 by photolithography, the resist films 52 are employed as masks for dry-etching the metal layer 50, thereby patterning the metal layer 50. Thus, the first collector electrode 21, the second collector electrode 22, the upper contact electrode 23 and the adhesive layer 25 are formed as shown in FIG. 12. Thereafter the resist films 52 are removed.

Figure 13:
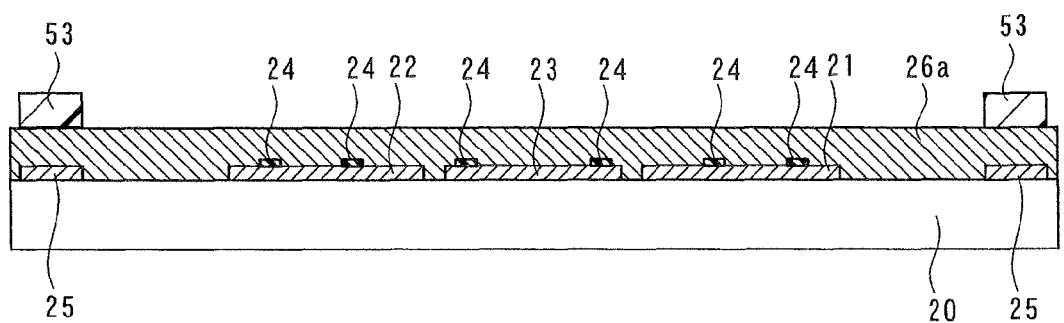
Figure 14:
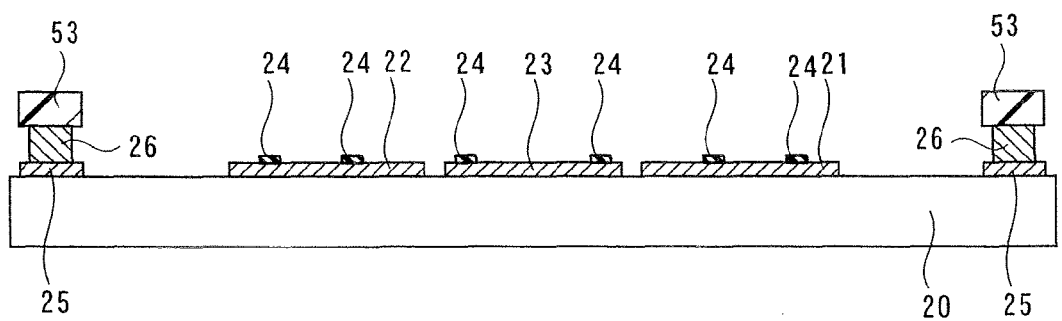

As shown in FIG. 13, after a Cu layer 26a is formed on an overall surface of the collector substrate 20 by plating, resist films 53 are formed on prescribed regions of the Cu layer 26a by photolithography. The resist films 53 are employed as masks for wet-etching the Cu layer 26a by using a mixed liquid of $FeCl_3$ and HCL, thereby forming the spacer 26 of Cu as shown in FIG. 14. Thereafter the resist films 53 are removed, whereby the collector substrate 20 is completed.

Figure 15:
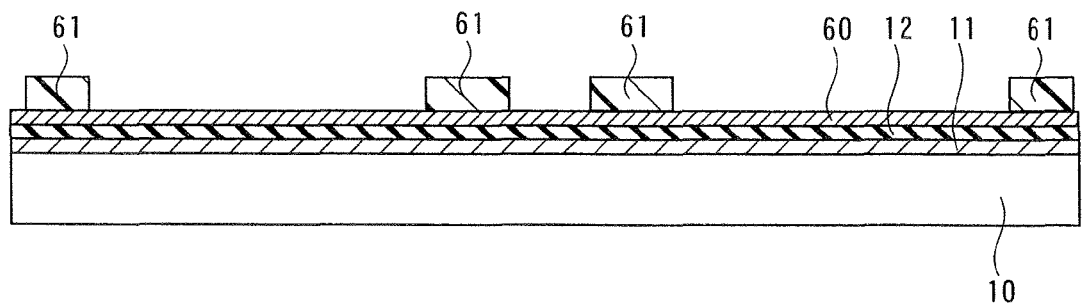
Figure 16:
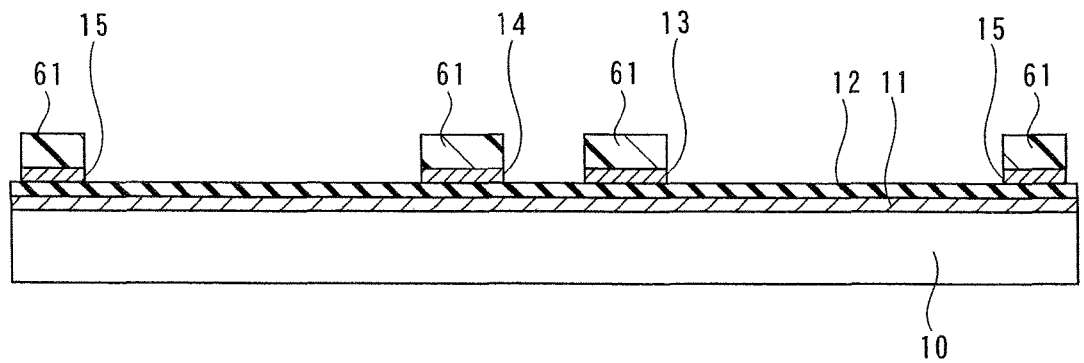

A manufacturing process of the fixed substrate 10 will be now described with reference to FIGS. 15 to 18. First, as shown in FIG. 15, the floating electrode 11 of Au (upper layer)/Cr (lower layer) having a thickness of about 2 μm is formed on the upper surface of the fixed substrate 10 made of glass having a thickness of about 500 μm by sputtering. The floating electrode 11 is so formed as to be opposed to the first and second collector electrodes 21 and 22. Then the insulating film 12 of the $SiO_2$ film having a thickness of about 2 Am is formed on the floating electrode 11 by plasma CVD. A metal layer 60 of Au (upper layer)/Cr (lower layer) having a thickness of about 2 μm is formed on the upper surface of the insulating film 12 by sputtering. After resist films 61 are formed on the metal layer 60 by lithography, the resist films 61 are employed as masks for dry-etching the metal layer 60, thereby performing patterning. Thus, the first lower contact electrode 13, the second lower contact electrode 14 and the adhesive layer 15 as shown in FIG. 16 are formed. Thereafter the resist films 61 are removed.

Figure 17:
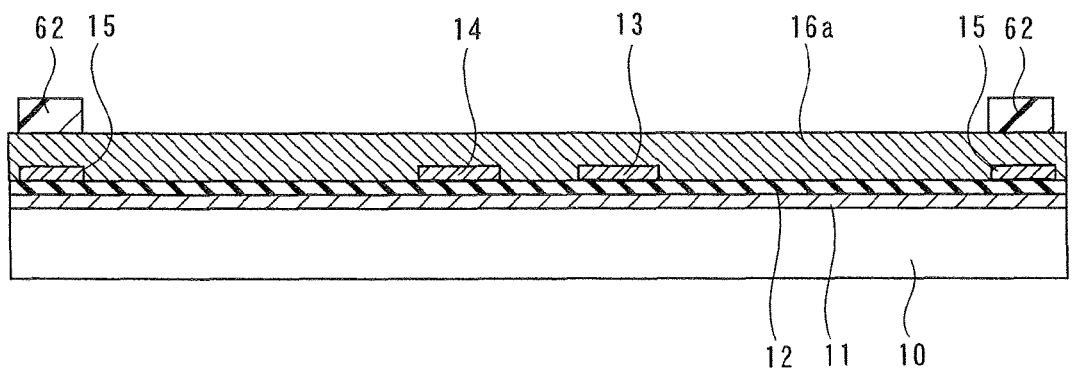
Figure 18:
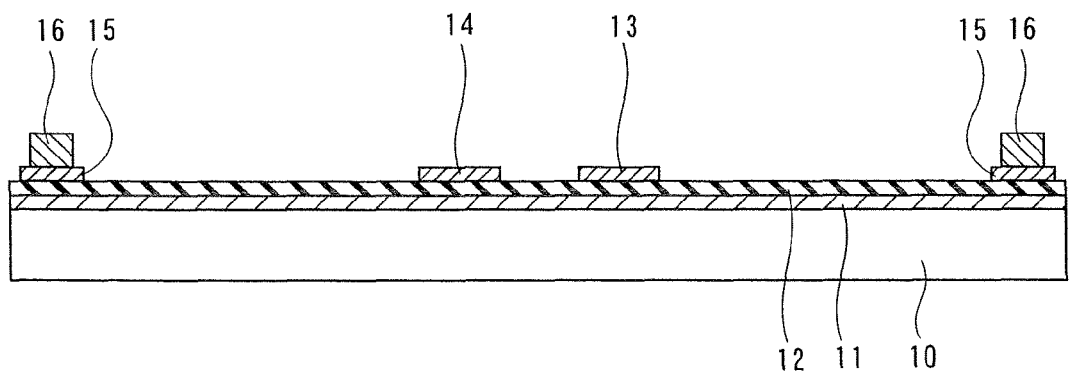

As shown in FIG. 17, after a Cu layer 16a is formed on an overall surface of the fixed substrate 10 by plating, the resist films 62 are formed on prescribed region of the Cu layer 16a by photolithography. Finally, wet etching is performed by using a mixed liquid of $FeCl_3$ and HCL as shown in FIG. 18, whereby the spacer 16 of Cu, shown in FIG. 18, is formed. Thereafter the resist films 62 are removed, whereby the fixed substrate 10 is completed.

Figure 19:
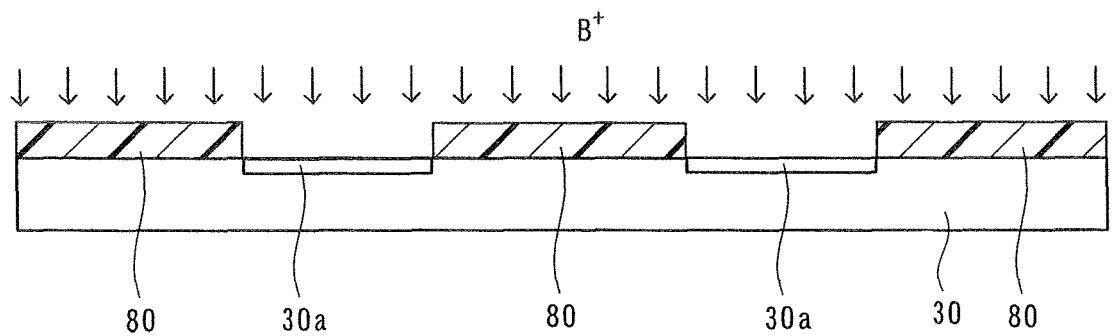
Figure 20:
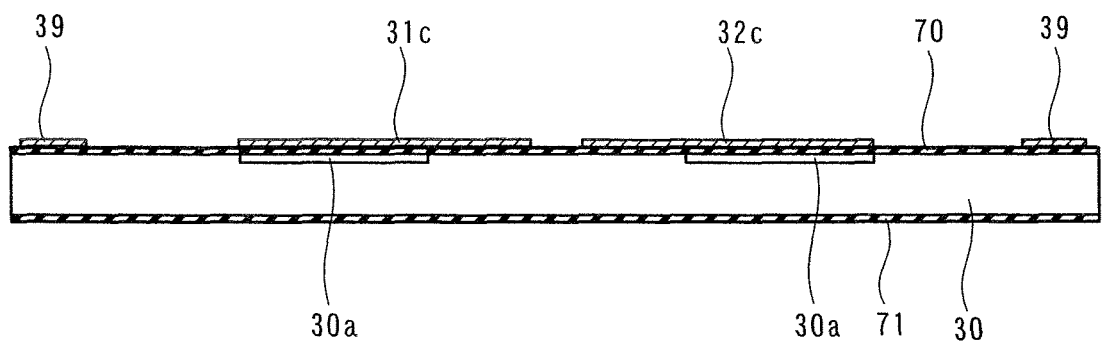

A manufacturing process of the vibrating substrate 30 of silicon will be now described with reference to FIGS. 19 to 26. As shown in FIG. 19, a boron ion is implanted from the upper surface of the vibrating substrate 30 after resist films 80 are formed on the upper surface of the vibrating substrate 30 having a thickness of about 500 μm by lithography, whereby the boron ion is implanted into regions 30a on which the spring portions 31a and 32a are formed. The regions where the boron is implanted each function as an etching stopper when the spring portions 31a and 32a are formed described later. Thereafter the resist films 80 are removed. Thermal oxide films 70 and 71 are formed on the upper and lower surfaces of the vibrating substrate 30 of $SiO_2$ respectively.

After a metal layer (not shown) of Au (upper layer)/Cr (lower layer) having a thickness of about 1 μm is formed on the upper surface of the vibrating substrate 30 by sputtering, patterning is performed on the metal layer by employing lithography and dry etching. Thus, the vibrating electrode layer 31c, the vibrating electrode layer 32c and the adhesive layer 39 as shown in FIG. 2 are formed.

Figure 21:
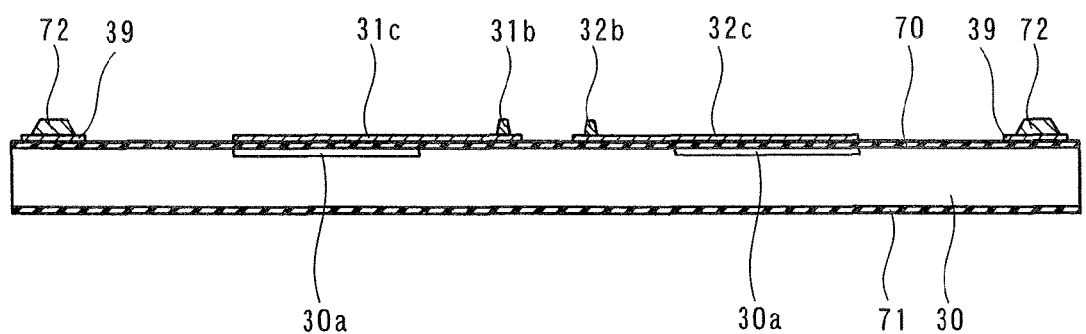

After a metal layer (not shown) of Cu having a thickness of about 2 μm is formed on an overall surface of the vibrating substrate 30 by plating, patterning is performed on the metal layer by employing wet etching. Thus, the protruding electrode 31b, the protruding electrode 32b and a metal layer 72 are formed as shown in FIG. 21.

Figure 22:
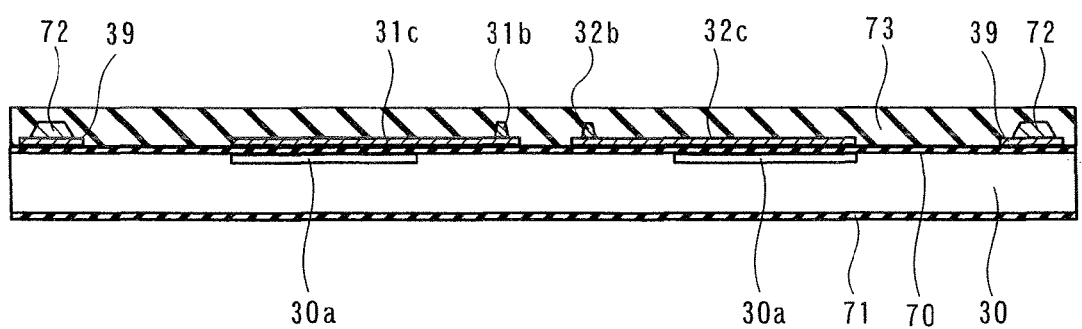
Figure 23:
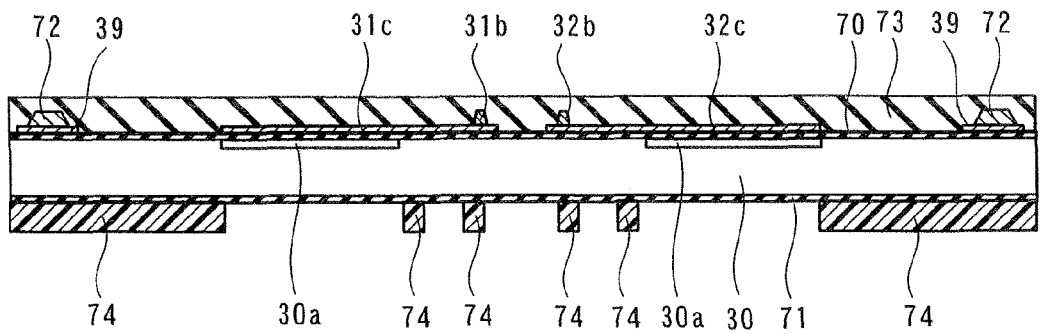
Figure 24:
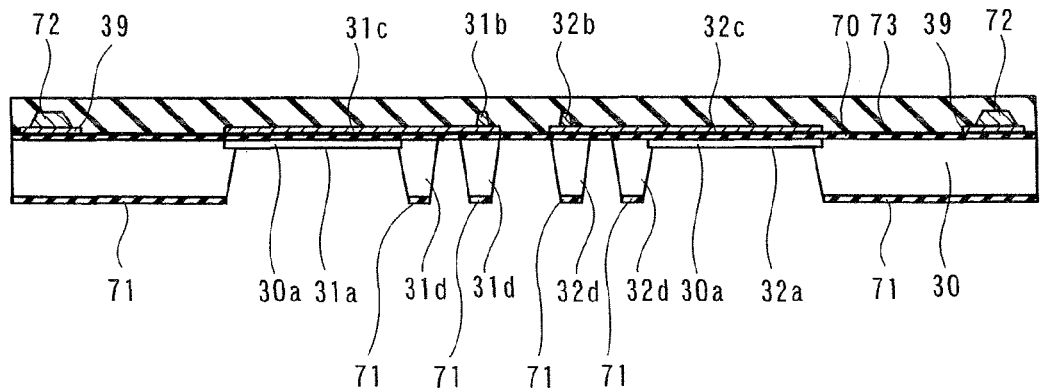

As shown in FIG. 22, a protective film 73 of an $SiO_2$ film is formed on the overall surface of the vibrating substrate 30 by plasma CVD. Thereafter resist films 74 are formed on prescribed regions of the lower surface of the vibrating substrate 30 by lithography, and patterning is thereafter performed on the resist films 74 employed as masks for dry-etching the thermal oxide film 71, as shown in FIG. 23. Thereafter the resist films 74 are removed. As shown in FIG. 24, the patterned thermal oxide film 71 is employed as a mask for etching the vibrating substrate 30 from the lower surface thereof by isotropic dry etching using a KOH aqueous solution and a tetramethylammonium hydroxide (TMAH) aqueous solution, whereby the spring portions 31a and 32a, the weight portions 31d and 32d are formed. At this time, the etching is stopped on the region where the thermal oxide film 70 is formed and the region where the boron ion is implanted. Thereafter etch back is performed from the lower surface of the vibrating substrate 30, whereby the thermal oxide film 71 and the exposed thermal oxide film 70 are removed.

Figure 25:
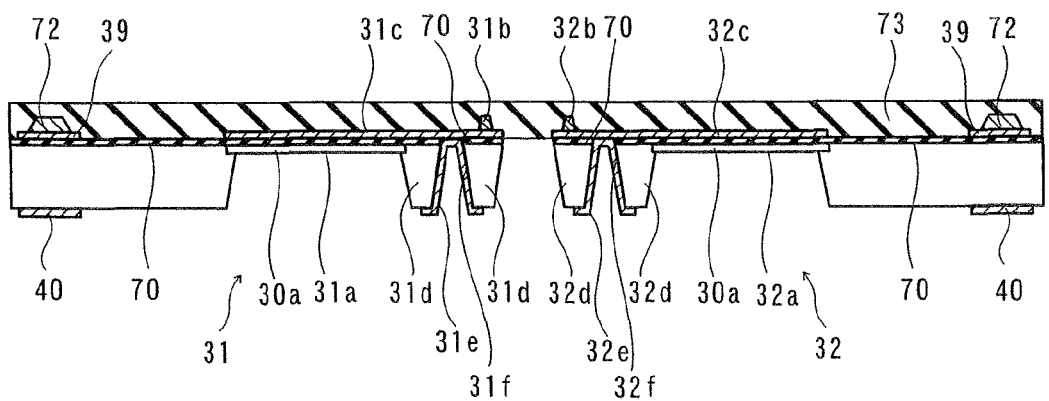
Figure 26:
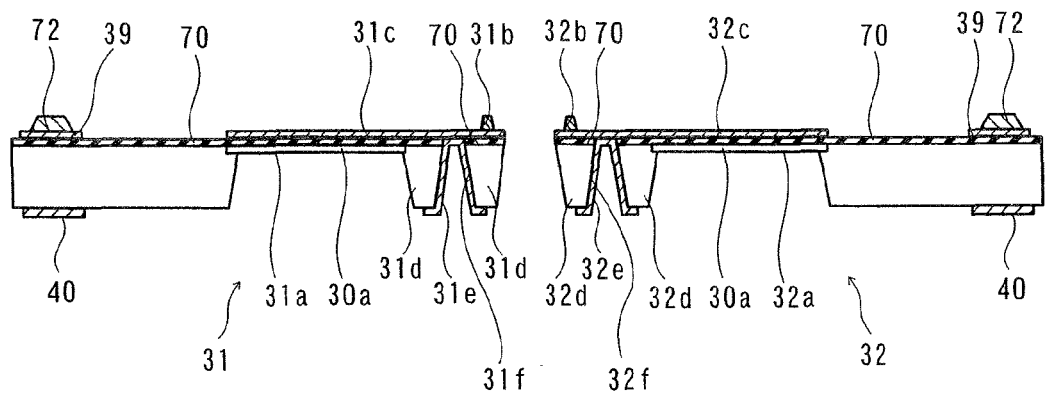

As shown in FIG. 25, after a metal layer (not shown) of Cu having a thickness of about 1 μm is formed on the overall surface of the lower surface of the vibrating substrate 30 by plating, patterning is performed on the metal layer by photolithography and wet etching. Thus, the penetrating electrode layers 31 and 32e and the adhesive layer 40 are formed. Thereafter the protective film 73 is removed by an HF solution and the vibrating substrate 30 are completed as shown in FIG. 26.

Finally, the collector substrate 20 and the vibrating substrate 30 are bonded to each other by wafer bonding and the fixed substrate 10 and the vibrating substrate 30 are bonded to each other by wafer bonding, as shown in FIG. 1. The wafer bonding is a method for aligning substrates using a wafer aligner system to bond the same to each other by heat or pressure. The wafer aligner system is a device performing the positioning of wafers with a microscope. According to the first embodiment, the spacer 26 of Cu and the metal layer 72 of Cu formed on the adhesive layer 39 of Au (upper layer)/Cr (lower layer) are bonded to each other by heat having a temperature of 400° C. Similarly, the spacer 16 of Cu and the metal layer 40 of Cu are bonded to each other by heat having a temperature of 400° C.

Second Embodiment

With reference to FIGS. 27 to 30, an electrostatic induction generator 1b according to a second embodiment is formed with first and second collector electrodes 101 and 102 also on a fixed substrate 10 dissimilarly to the electrostatic induction generator according to the aforementioned first embodiment.

Figure 27:
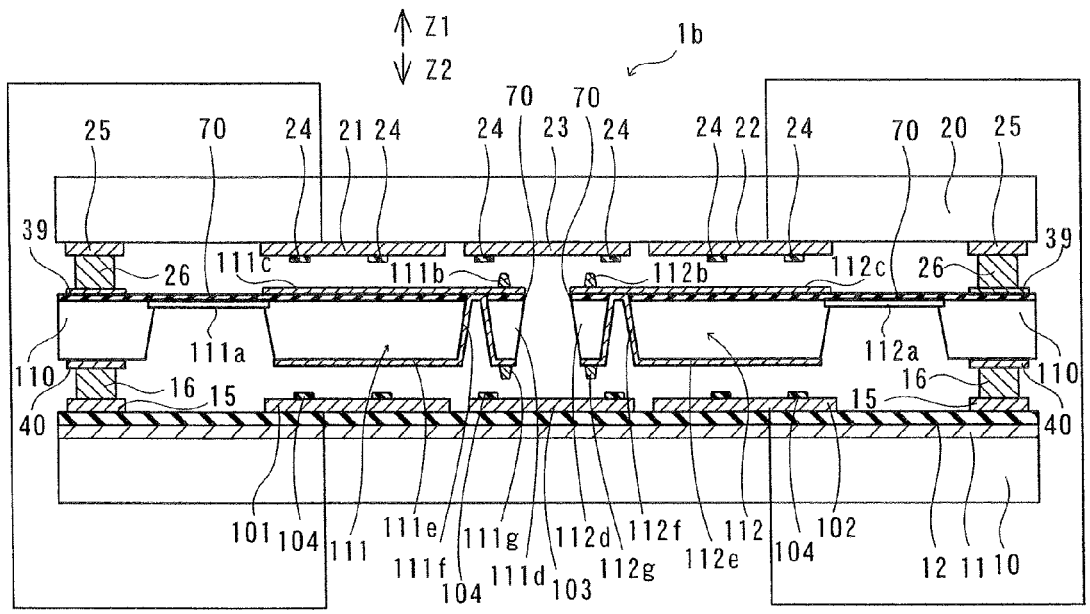
FIG. 27 is a sectional view of an electrostatic induction generator according to a second embodiment of the present invention.
Figure 28:
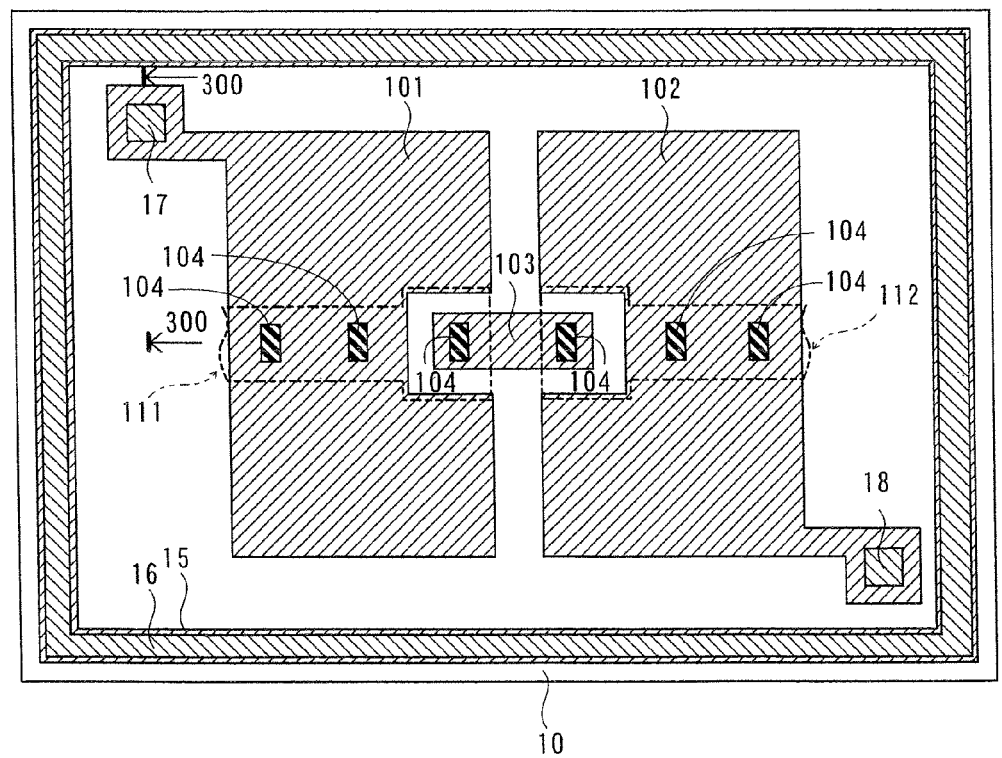
FIG. 28 is a top plan view of a fixed substrate of the electrostatic induction generator according to the second embodiment of the present invention.

The electrostatic induction generator 1b according to the second embodiment is constituted by three layers of a fixed substrate 10, a collector substrate 20, a vibrating substrate 110 consisting of silicon arranged between the fixed substrate 10 and the collector substrate 20, as shown in FIG. 27. The vibrating substrate 110 is an example of the "second substrate" in the present invention. The structure of the electrostatic induction generator 1*b* will be now described in detail.

As shown in FIG. 27, the floating electrode 11 is formed on an upper surface of the fixed substrate 10. A insulating film 12 is formed on an upper surface of the floating electrode 11. According to the second embodiment, a first collector electrode 101 of Au (upper layer)/Cr (lower layer) having a thickness of about 2 μm and a second collector electrode 102 of Au (upper layer)/Cr (lower layer) having a thickness of about 2 μm are so formed on an upper surface of the insulating film 12 as to be opposed to a first vibrating electrode portion 111 and a second vibrating electrode portion 112 described later at prescribed intervals respectively. The first and second collector electrodes 101 and 102 are examples of the "fourth electrode" in the present invention. According to the second embodiment, a lower contact electrode 103 of Au (upper layer)/Cr (lower layer) having a thickness of about 2 μm is formed between the first and second collector electrodes 101 and 102 on the upper surface of the fixed substrate 10 at prescribed intervals from the first and second collector electrodes 101 and 102. The lower contact electrode 103 is an example of the "fifth electrode" in the present invention. Three pairs of stoppers 104 of SiN each having a thickness of about 1 μm are so formed on lower surfaces of the first collector electrode 101, the second collector electrode 102 and the upper contact electrode 103 as to be opposed to the first and second vibrating electrode portions 31 and 32 described later, respectively. The stopper 104 is an example of the "second contact inhibition member" in the present invention.

A structure of the collector substrate 20 is similar to that of the collector substrate 20 according to the aforementioned first embodiment.

As shown in FIG. 27, the vibrating substrate 110 of silicon having a thickness of about 500 μm is formed with the first and second vibrating electrode portions 111 and 112 each having a cantilever structure. The first and second vibrating electrode portions 111 and 112 are examples of the "vibrating electrode" in the present invention. The first vibrating electrode portion 111 and the second vibrating electrode portion 112 are so arranged as to be opposed to the first collector electrodes 21 and 101 and the second collector electrodes 22 and 102 respectively. The first and second vibrating electrode portions 111 and 112 are so arranged as to opposed to the upper contact electrode 23 and the lower contact electrode 103 respectively.

The first vibrating electrode portion 111 (second vibrating electrode portion 112) is formed with a spring portion 111*a* (112*a*) having a thickness of about 5 μm and a protruding electrode 111*b* (112*b*) of Cu having a thickness of about 2 μm, a vibrating electrode layer 111*c* (112*c*) of Au (upper layer)/Cr (lower layer) having a thickness of about 1 μm, for producing electrostatic induction with charges stored in the first collector electrode 21 (second collector electrode 22), a weight portion 111*d* (112*d*) having a thickness of about 500 μm, and a penetrating electrode layer 111*e* (112*e*) of Cu having a thickness of about 1 μm. The vibrating electrode layer 111*c* (112*c*) is so formed as to cover upper surfaces of the spring portion 111*a* (112*a*) and the weight portion 111*d* (112*d*) of the first vibrating electrode portion 111 (second vibrating electrode portion 112). The protruding electrode 111*b* (112*b*) is so formed on an upper surface of the vibrating electrode layer 111*c* (112*c*) as to be opposed to the upper contact electrode 23 and is constituted such that the protruding electrode 111*b* (112*b*) is capable of coming into contact with the upper contact electrode 23 when the vibrating electrode layer 111*c* (112*c*) vibrates upward (direction Z1).

As shown in FIG. 27, the first vibrating electrode portion 111 (second vibrating electrode portion 112) is formed with a through hole 111*f* (112*f*). The penetrating electrode layer 111*e* (112*e*) is so formed as to cover a lower surface of the first vibrating electrode portion 111 (second vibrating electrode portion 112) and the through hole 111*f* (112*f*) and come into contact with the vibrating electrode layer 111*c* (112*c*) through the through hole 111*f* (112*f*). The protruding electrode 111*g* (112*g*) of Cu having a thickness of about 2 μm is formed on a lower surface of the penetrating electrode layer 111*e* (112*e*). The protruding electrode 111*g* (112*g*) is so formed on the lower surface of the penetrating electrode layer 111*e* (112*e*) as to be opposed to the lower contact electrode 103 and is constituted such that the protruding electrode 111*g* (112*g*) is capable of coming into contact with the lower contact electrode 103 when the penetrating electrode layer 111*e* (112*e*) vibrates downward (direction Z2).

Figure 29:
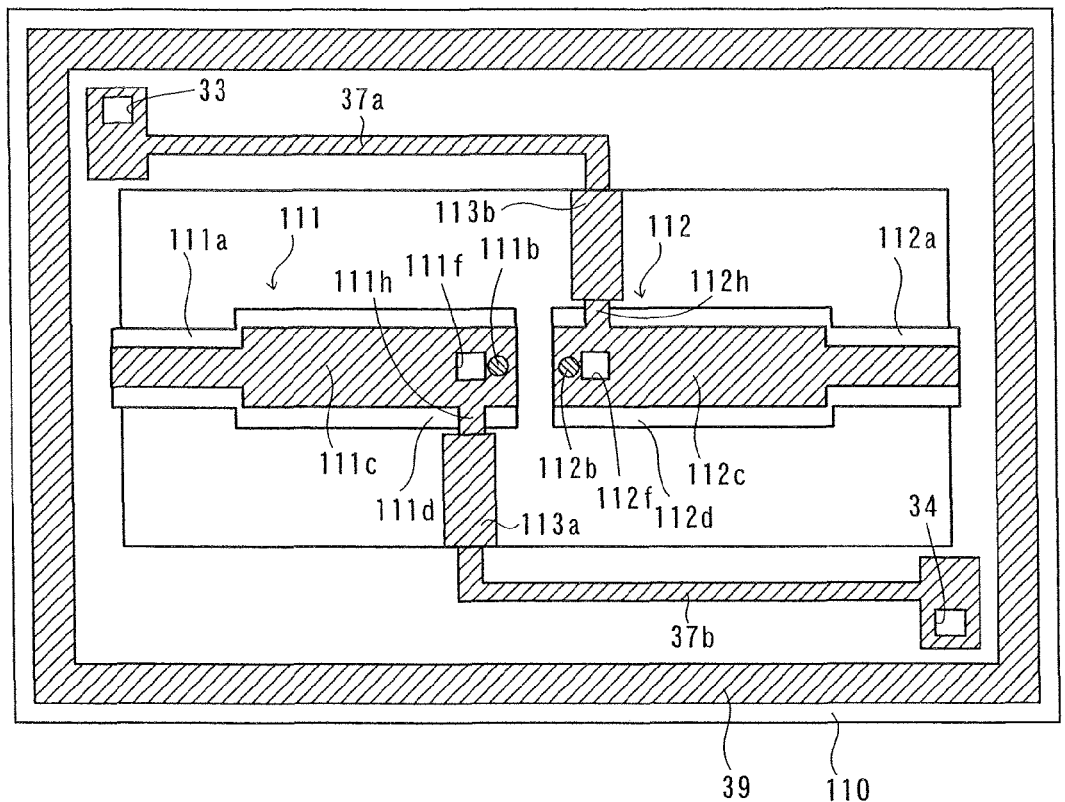
FIG. 29 is a top plan view of a vibrating substrate of the electrostatic induction generator according to the second embodiment of the present invention.
Figure 30:
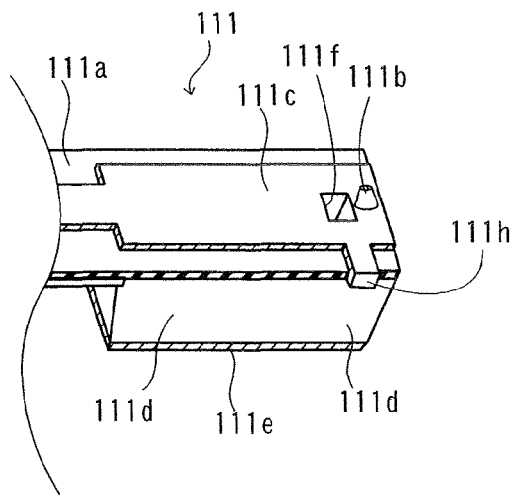
FIG. 30 is an enlarged view of an end of a vibrating electrode of the electrostatic induction generator according to the second embodiment of the present invention.

As shown in FIG. 29, the vibrating substrate 110 is provided with a spring electrode 113*a* (113*b*) constituted by a plate spring-like member, electrically connecting to the vibrating electrode layer 111*c* (112*c*) formed in the first vibrating electrode portion 111 (second vibrating electrode portion 112) in a state of applying no vibration to the vibrating substrate 110. The spring electrodes 113*a* and 113*b* are examples of the "sixth electrode" in the present invention. As shown in FIG. 30, the vibrating electrode layer 111*c* (112*c*) is provided with a contact portion 111*h* (112*h*) so formed into a L-shape as to cover a prescribed region of a side surface of the weight portion 111*d* (112*d*) and coming into contact with the spring electrode 113*a* (113*b*). The spring electrode 113*a* (113*b*) is provided between the weight portion 111*d* (112*d*) of the first vibrating electrode portion 111 (second vibrating electrode portion 112) and the vibrating substrate 110 in plan view. The first vibrating electrode portion 111 (second vibrating electrode portion 112) and the spring electrode 113*a* (113*b*) are so formed as not to electrically connected to each other in a state where the first vibrating electrode portion 111 (second vibrating electrode portion 112) moves close to the first collector electrode 21 (second collector electrode 22) or the first collector electrode 101 (second collector electrode 102) by vibration.

As shown in FIGS. 2, 4, 28 and 29, the first collector electrode 21 (second collector electrode 22), the first collector electrode 101 (second collector electrode 102) and the spring electrode 113*b* (113*a*) are electrically connected to each other through a connecting electrode 27 (28), a wiring layer 37*a* (37*b*), and a penetrating electrode layer 35 (36) and a connecting electrode 17 (18).

With reference to FIG. 27, a power generating operation of the electrostatic induction generator 1*b* will be now described.

When vibration is applied to the electrostatic induction generator 1*b* in the direction Z1, the first and second vibrating electrode portions 111 and 112 moves to close to the first and second collector electrodes 21 and 22 respectively and the first and second vibrating electrode portions 111 and 112 are electrically connected to each other through the protruding electrode 111*b*, the upper contact electrode 23 and the protruding electrode 112*b*. Different charges from each other are stored in the first and second collector electrodes 21 and 22 respectively, and the different charges from each other are induced in the vibrating electrode layers 111*c* and 112*c* by electrostatic induction.

Then, vibration is applied to the electrostatic induction generator 1*b* in the direction Z2, whereby the first and second vibrating electrode portions 111 and 112 are electrically disconnected to each other. Thereafter the first vibrating electrode portion 111 (second vibrating electrode portion 112) is electrically connected to the spring electrode 113a (113b) as shown in FIG. 29. Thus, charges stored in the vibrating electrode layer 111c (112c) are carried to the first collector electrode 21 (second collector electrode 22) and the first collector electrode 101 (second collector electrode 102).

Vibration is further applied to the electrostatic induction generator 1b in the direction Z2, whereby the first and second vibrating electrode portions 111 and 112 move close to the first and second collector electrodes 101 and 102 and the first and second vibrating electrode portions 111 and 112 are electrically connected to each other through the protruding electrode 111g, the lower contact electrode 103 and the protruding electrode 112g. Different charges from each other are stored in the first and second collector electrodes 101 and 102 respectively, and the different charges from each other are induced in the vibrating electrode layers 111e and 112e by electrostatic induction.

Then, vibration is applied to the electrostatic induction generator 1b in the direction Z1, whereby the first and second vibrating electrode portions 111 and 112 are electrically disconnected to each other. Thereafter the first vibrating electrode portion 111 (second vibrating electrode portion 112) is electrically connected to the spring electrode 113a (113b) as shown in FIG. 29. Charges stored in the vibrating electrode layer 111c (112c) are carried to the first collector electrode 21 (second collector electrode 22) and the first collector electrode 101 (second collector electrode 102).

Charges are stored in the first collector electrode 21 (101) and the second collector electrode 22 (102) respectively each time the aforementioned vibration is repeated, thereby allowing increase in potential difference. Power generation can be performed due to this potential difference. According to the second embodiment, the first and second collector electrodes 101 and 102 are formed also on the upper surface of the fixed substrate 10 dissimilarly to the aforementioned first embodiment, whereby greater power generation can be obtained as compared with the electrostatic induction generator according to the aforementioned embodiment.

Third Embodiment

Figure 31:
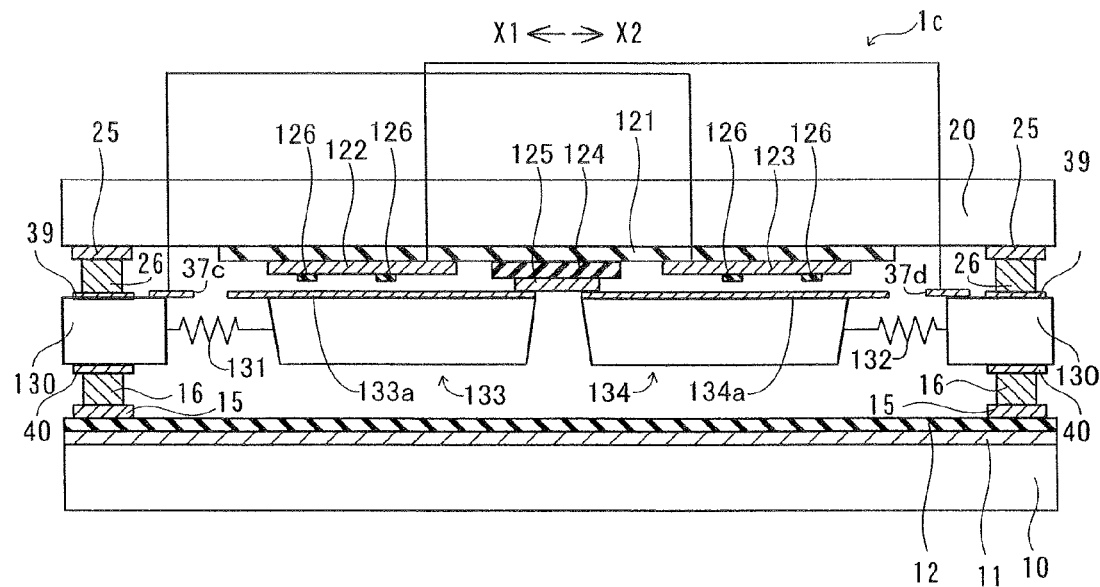
FIG. 31 is a sectional view of an electrostatic induction generator according to a third embodiment of the present invention.
Figure 32:
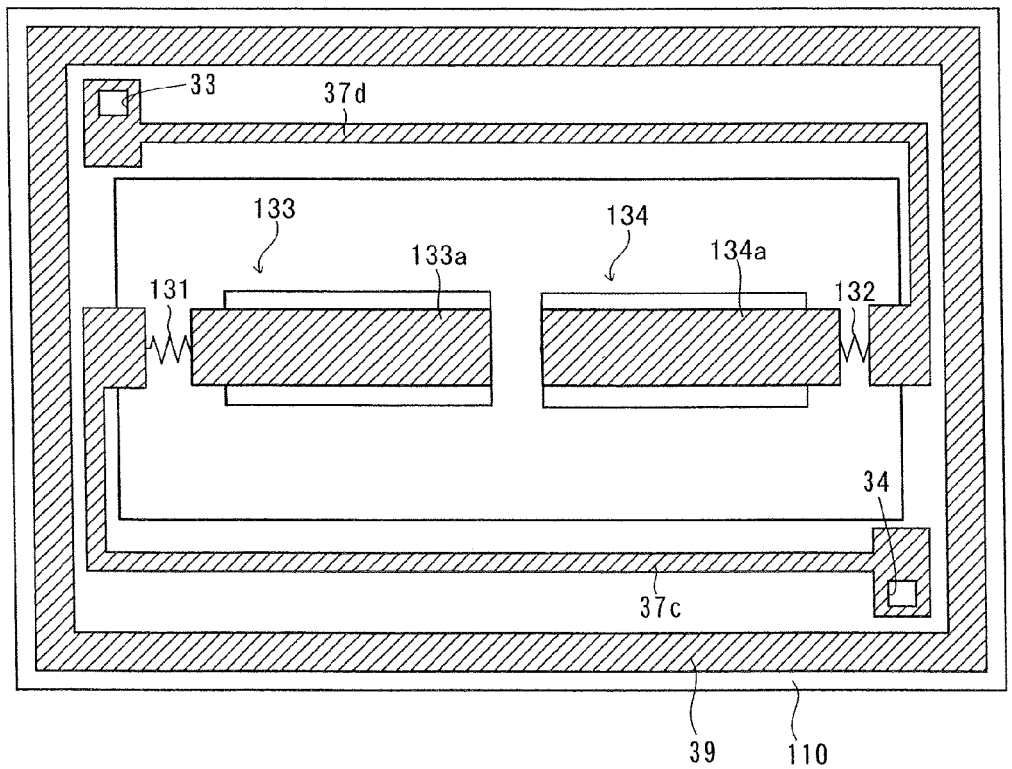
FIG. 32 is a top plan view of a vibrating substrate of the electrostatic induction generator according to the third embodiment of the present invention.

With reference to FIGS. 31 and 32, a first vibrating electrode portion 133 and a second vibrating electrode portion 134 vibrate in directions along surfaces of a first collector electrode 122 and a second collector electrode 123 respectively in an electrostatic induction generator 1c according to a third embodiment, dissimilarly to the electrostatic induction generator 1 according to the aforementioned first embodiment.

The electrostatic induction generator 1c according to the third embodiment is constituted by three layers of a fixed substrate 10, a collector substrate 20, a vibrating substrate 130 consisting of silicon arranged between the fixed substrate 10 and the collector substrate 20, as shown in FIG. 31. The vibrating substrate 130 is an example of the "second substrate" in the present invention. The structure of the electrostatic induction generator 1c will be now described in detail.

As shown in FIG. 31, a floating electrode 11 is formed on an upper surface of the fixed substrate 10. The floating electrode 11 is so formed as to correspond to the first collector electrode 122 and the second collector electrode 123 described later. However, portions corresponding to the first collector electrode 122 and the second collector electrode 123 of the floating electrode 11 are electrically connected to each other dissimilarly to the first and second collector electrodes 122 and 123 electrically disconnected to each other. An insulating film 12 of SiO$_2$ having a thickness of about 2 µm is formed on a surface of the floating electrode 11.

The remaining structure of the fixed substrate 10 is similar to that of the fixed substrate 10 according to the aforementioned first embodiment.

As shown in FIG. 31, a insulating film 121 is formed on a prescribe region of the lower surface of the collector substrate 20. A first collector electrode 122 of Au (upper layer)/Cr (lower layer) having a thickness of about 2 µm and a second collector electrode 123 of Au (upper layer)/Cr (lower layer) having a thickness of about 2 Am are so formed on a lower surface of the insulating film 121 as to opposed to the first and second vibrating electrode portions 133 and 134 described later at prescribed intervals, respectively. The first collector electrode 122 and the second collector electrode 123 are examples of the "first electrode" in the present invention. An insulating film 124 is formed on a prescribed region of the insulating film 121. An upper contact electrode 125 of Au (upper layer)/Cr (lower layer) having a thickness of about 2 µm is formed between the first vibrating electrode portion 133 and the second vibrating electrode portion 134 on a lower surface of the insulating film 124. The upper contact electrode 125 is an example of the "second electrode" in the present invention. Two pairs of stoppers 126 of SiN each having a thickness of about 1 µm are so formed on lower surfaces of the first collector electrode 122 and the second collector electrode 123 as to be opposed to the first and second vibrating electrode portions 133 and 134 described later, respectively. The stopper 126 is an example of the "first contact inhibition member" in the present invention.

The remaining structure of the collector substrate 20 is similar to that of the collector substrate 20 according to the aforementioned first embodiment.

As shown in FIG. 31, the vibrating substrate 130 of silicon having a thickness of about 500 µm is connected to the first and second vibrating electrode portions 133 and 134 through the spring portions 131 and 132. The first and second vibrating electrode portions 133 and 134 are examples of the "vibrating electrode" in the present invention. The spring portion 131 and the spring portion 132 are examples of the "first spring portion" in the present invention. The first and second vibrating electrode portions 133 and 134 are so arranged as to be opposed to the first and second collector electrodes 122 and 123 respectively. The first and second collector electrodes 122 and 123 are so formed as to be electrically connected to each other through the upper contact electrode 125 in a state where the first and second collector electrodes 122 and 123 do not vibrate.

Vibrating electrode layers 133a and 134a of Au (upper layer)/Cr (lower layer) each having a thickness of about 1 µm for producing electrostatic induction with charges stored in the first and second collector electrodes 122 and 123 are formed on surfaces of the first and second vibrating electrode portions 133 and 134 respectively. The vibrating electrode layers 133a and 134a are so formed as to protrude from the surfaces of the first and second vibrating electrode portions 133 and 134 toward the vibrating substrate 130.

As shown in FIGS. 31 and 32, a wiring layer 37c is electrically connected to the second collector electrode 123, while a wiring layer 37d is electrically connected to the first collector electrode 122. The vibrating electrode layer 133a (134a) formed on a surface of the first vibrating electrode portion 133 (second vibrating electrode portion 134) and the wiring layer 37c (37d) are so formed as to be electrically connected to each other when the first vibrating electrode portion 133 (second vibrating electrode portion 134) vibrates in a direction X1

(X2) shown in FIG. 31. The directions X1 and X2 are directions along the surfaces of the first and second collector electrodes 122 and 123.

With reference to FIG. 31, a power generating operation of the electrostatic induction generator 1c will be now described.

In a state where no vibration is applied to the electrostatic induction generator 1c, shown in FIG. 31, the vibrating electrode layers 133a and 134a are electrically connected to each other through the upper contact electrode 125, and different charges from each other are induced in the vibrating electrode layer 133a and 134a by electrostatic induction. The first and second collector electrodes 122 and 123 store different charges from each other respectively.

When vibration is applied to the electrostatic induction generator 1c in the direction X1, the first and second vibrating electrode portions 133 and 134 moves in the direction X. Thus, the vibrating electrode layer 133a formed on the surface of the first vibrating electrode portion 133 and the wiring layer 37c are electrically connected to each other. Consequently, charges stored in the vibrating electrode layer 133a are carried to the second collector electrode 123.

Then, vibration is applied to the electrostatic induction generator 1c in the direction X2, whereby the vibrating electrode layer 133a and 134a are electrically connected to each other through the upper contact electrode 125 as shown in FIG. 31. Thus, different charges from each other are induced in the vibrating electrode layers 133a and 134a by electrostatic induction.

Vibration is further applied to the electrostatic induction generator 1c in the direction X2, whereby the first and second vibrating electrode portions 133 and 134 move in the direction X2. Thus, the vibrating electrode layer 134a formed on the surface of the second vibrating electrode portion 134 and the wiring layer 37d are electrically connected to each other. Consequently, charges stored in the vibrating electrode layer 134a are carried to the first collector electrode 122.

Charges stored in the first and second collector electrodes 122 and 123 respectively each time the aforementioned vibration is repeated, whereby potential difference can be increased. Power generation can be performed due to the potential difference.

Fourth Embodiment

Figure 33:
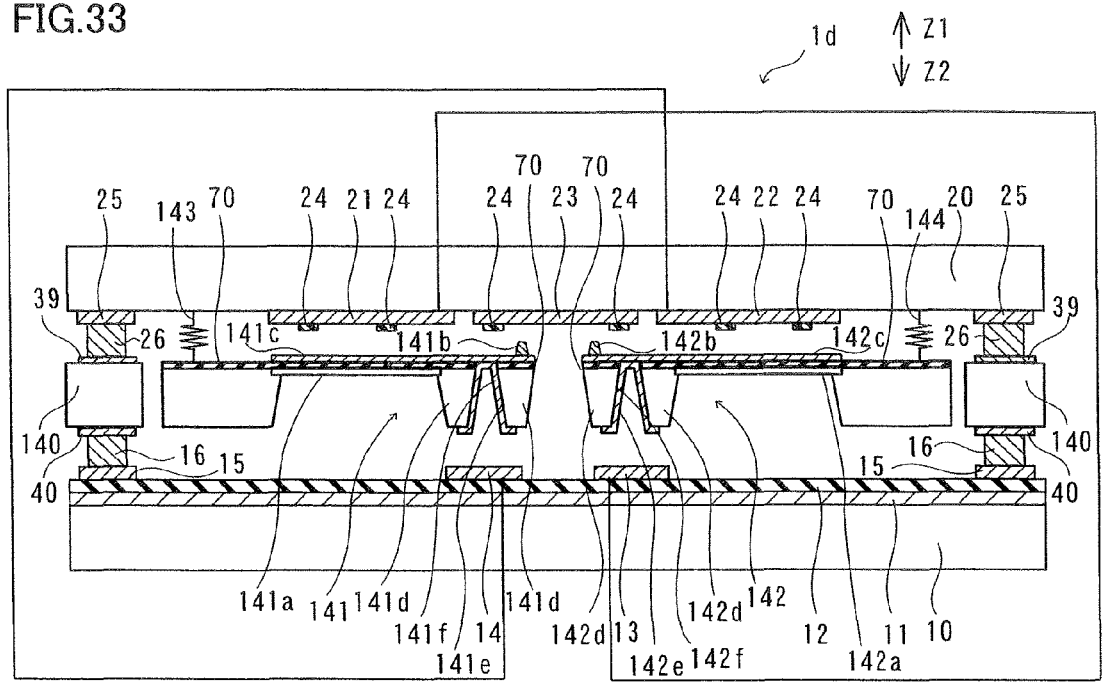
FIG. 33 is a sectional view of an electrostatic induction generator according to a fourth embodiment of the present invention.

In an electrostatic induction generator 1d according to a fourth embodiment, a first vibrating electrode portion 141 and a second vibrating electrode portion 142 are connected to a collector substrate 20 through spring portions 143 and 144 respectively dissimilarly the electrostatic induction generator 1 according to the aforementioned first embodiment, with reference to FIG. 33. The spring portion 143 and the spring portion 144 are examples of the "second spring portion" in the present invention.

The electrostatic induction generator 1d according to the fourth embodiment is constituted by three layers of a fixed substrate 10, the collector substrate 20, a vibrating substrate 140 consisting of silicon arranged between the fixed substrate 10 and the collector substrate 20, as shown in FIG. 33. The vibrating substrate 140 is an example of the "second substrate" in the present invention. The structure of the electrostatic induction generator 1d will be now described in detail.

As shown in FIG. 33, the first vibrating electrode portion 141 and the second vibrating electrode portion 142 are connected to the collector substrate 20 through the spring portion 143 and 144 respectively. The first vibrating electrode portion 141 and the second vibrating electrode portion 142 are examples of the "vibrating electrode" in the present invention. Structures of a spring portion 141a, a protruding electrode 141b (142b), a vibrating electrode layer 141c (142c), a weight portion 141d (142d), a penetrating electrode layer 141e (142e) and a through hole 141f (142f) formed in the first vibrating electrode portion 141 (second vibrating electrode portion 142) are similar to those according to the aforementioned first embodiment.

The remaining structure of the fourth embodiment is similar to that of the aforementioned first embodiment.

The operation of the fourth embodiment is similar to that of the aforementioned first embodiment.

Fifth Embodiment

Figure 34:
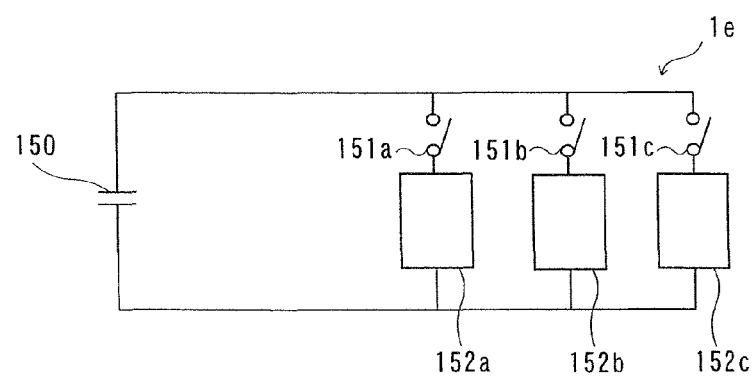
FIG. 34 is a block diagram of an electrostatic induction generator according to a fifth embodiment of the present invention.

With reference to FIG. 34, an electrostatic induction generator 1e according to a fifth embodiment comprises a plurality of electrostatic induction generators dissimilarly to the electrostatic induction generators according to the aforementioned first to fourth embodiment.

The electrostatic induction generator 1e according to the fifth embodiment comprises a capacitor 150 and a plurality of electrostatic induction generators 152a to 152c electrically connected to the capacitor 150 through switches 151a to 151c, as shown in FIG. 34. The electrostatic induction generators 152a to 152c are constituted by any of the electrostatic induction generators 1 and 1b to 1d shown in aforementioned first to fourth embodiments. The electrostatic induction generators 152a to 152c are constituted such the electrostatic induction generator performing power generation by vibration in the directions X1 and X2 (horizontal direction) (see FIG. 31) and the electrostatic induction generator performing power generation by vibration in the directions Z1 and Z2 directions (vertical direction) (see FIGS. 27 and 33) are mixed. Thus, the electrostatic induction generator 1e can perform power generation in a plurality of vibration directions. Electric power generated by the plurality of electrostatic induction generators 152a to 152c is stored in the capacitor 150.

Although the present invention has been described and illustrated in detail, it is clearly understood that the same is by way of illustration and example only and is not to be taken by way of limitation, the spirit and scope of the present invention being limited only by the terms of the appended claims.

For example, while the stoppers of the SiN film are employed as a stopper in the aforementioned first to fourth embodiments, the present invention is not restricted to this but $SiO_2$ film may be alternatively employed as the stopper.

While the substrates made of glass are employed as the collector substrate and the fixed substrate in the aforementioned first to fourth embodiments, the present invention is not restricted to this but a substrate of silicon may be alternatively employed.

While the electrostatic induction generator 1e is constituted by the three electrostatic induction generators 152a to 152c in the aforementioned fifth embodiment, the present invention is not restricted to this but the electrostatic induction generator 1e may be alternatively constituted by a plurality of the electrostatic induction generators capable of performing power generation by vibration in different vibration directions.

What is claimed is:
1. An electrostatic induction generator comprising:
a pair of first electrodes formed at a prescribed interval from each other, wherein at least one of said first electrodes includes a prescribed charge as an initial charge;

a pair of vibrating electrodes so provided as to be opposed to said pair of first electrodes at a prescribed interval, capable of vibrating in a first direction and a second direction different from said first direction, and charged with opposite charges due to charges stored in said pair of first electrodes respectively; and a second electrode so provided at prescribed intervals from said pair of first electrodes as to be opposed to said pair of vibrating electrodes, for electrically connecting said pair of vibrating electrodes to each other in a case where said pair of vibrating electrodes are at prescribed positions.

2. The electrostatic induction generator according to claim 1, further comprising a pair of third electrodes so provided as to be opposed to said pair of vibrating electrodes, coming into contact with said pair of vibrating electrodes when said pair of vibrating electrodes vibrate in said second direction, and electrically connected to said pair of first electrodes respectively.

3. The electrostatic induction generator according to claim 2, wherein
said vibrating electrode is charged due to vibration in said first direction and said charge is carried to said third electrode by connecting to said third electrode due to vibration in said second direction.

4. The electrostatic induction generator according to claim 2, further comprising:
a first substrate having a surface formed with said third electrode thereon; and
a floating electrode formed between said surface of said first substrate and said third electrode.

5. The electrostatic induction generator according to claim 1, wherein
first contact inhibition member for inhibiting said vibrating electrode from being electrically connected to said first electrode is provided on a surface opposed to said vibrating electrode of said first electrode.

6. The electrostatic induction generator according to claim 1, wherein
said vibrating electrode has a cantilever structure and a forward end of said vibrating electrode is provided with a weight portion.

7. The electrostatic induction generator according to claim 1, wherein
a vibrating electrode layer is formed on a first surface of said vibrating electrode.

8. The electrostatic induction generator according to claim 1, wherein
said vibrating electrode includes a through hole penetrating from a first surface of said vibrating electrode to a second surface of said vibrating electrode, and a penetrating electrode layer provided on said second surface of said vibrating electrode and coming into contact with said vibrating electrode through said through hole.

9. The electrostatic induction generator according to claim 1, wherein
said first direction is a direction closer to said first electrode and said second direction is a direction separated from said first electrode.

10. The electrostatic induction generator according to claim 1, wherein
said vibrating electrode includes a protruding electrode formed on a first surface of said vibrating electrode, for electrically connecting said vibrating electrode and said second electrode.

11. The electrostatic induction generator according to claim 1, further comprising a pair of fourth electrodes capable of storing charges, so provided on a side opposite to a side, on which said pair of first electrodes are provided, of said pair of vibrating electrodes as to be opposed to said pair of vibrating electrodes at a prescribed interval and formed at a prescribed interval from each other.

12. The electrostatic induction generator according to claim 11, further comprising a fifth electrode so provided at prescribed intervals from said pair of fourth electrodes as to be opposed to said pair of vibrating electrodes, for electrically connecting said pair of vibrating electrodes to each other in a case where said pair of vibrating electrodes are at prescribed positions.

13. The electrostatic induction generator according to claim 11, wherein
a second contact inhibition member for inhibiting said vibrating electrode from being electrically connected to said fourth electrode is provided on a surface opposed to said vibrating electrode of said fourth electrode.

14. The electrostatic induction generator according to claim 11, further comprising a sixth electrode electrically connected to said first electrode and said fourth electrode, and carrying a charge stored in said vibrating electrode to said first electrode and said fourth electrode by coming into contact with said vibrating electrode when said vibrating electrode vibrates.

15. The electrostatic induction generator according to claim 14, wherein
said sixth electrode is formed by a plate spring-like member.

16. The electrostatic induction generator according to claim 1, further comprising a second substrate for fixing said pair of vibrating electrodes, wherein
said pair of vibrating electrodes and said second substrate are bonded to each other through first spring portions in a direction along a surface of said first electrode.

17. The electrostatic induction generator according to claim 16, wherein
said first direction and said second direction different from said first direction in which said pair of vibrating electrodes vibrate are directions along said surface of said first electrode.

18. The electrostatic induction generator according to claim 1, further comprising a third substrate so provided as to be opposed to said vibrating electrode and formed with said first electrode, wherein
said vibrating electrode and said third substrate are bonded to each other through a second spring portion in a direction closer to said first electrode.

19. The electrostatic induction generator according to claim 18, wherein
said first direction and said second direction different from said first direction in which said pair of vibrating electrodes vibrate are a direction closer to said first electrode and a direction separated from said first electrode.

20. The electrostatic induction generator according to claim 1, wherein
a plurality of said electrostatic induction generators are provided and includes said electrostatic induction generator in which said pair of vibrating electrodes vibrate in a direction closer to said first electrode and a direction separated from said first electrode and said electrostatic induction generator in which said pair of vibrating electrodes vibrate in a direction along a surface of said first electrode.

* * * * *